United States Patent
Wu et al.

(10) Patent No.: US 11,262,916 B2
(45) Date of Patent: Mar. 1, 2022

(54) DISTRIBUTED STORAGE SYSTEM, DATA PROCESSING METHOD, AND STORAGE NODE

(71) Applicant: Huawei Technologies Co., Ltd., Shenzhen (CN)

(72) Inventors: Zhangling Wu, Shenzhen (CN); Mingchang Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 16/943,279

(22) Filed: Jul. 30, 2020

(65) Prior Publication Data

US 2020/0356282 A1    Nov. 12, 2020

Related U.S. Application Data

(63) Continuation of application No. PCT/CN2018/104487, filed on Sep. 7, 2018.

(30) Foreign Application Priority Data

Jan. 31, 2018   (CN) .......................... 201810099610.X

(51) Int. Cl.
    G06F 3/06        (2006.01)
(52) U.S. Cl.
    CPC ............ G06F 3/0613 (2013.01); G06F 3/067 (2013.01); G06F 3/0629 (2013.01); G06F 3/0658 (2013.01); G06F 3/0659 (2013.01)

(58) Field of Classification Search
    None
    See application file for complete search history.

(56) References Cited

U.S. PATENT DOCUMENTS

| | | | |
|---|---|---|---|
| 2006/0129614 A1 | 6/2006 | Kim et al. | |
| 2008/0140932 A1* | 6/2008 | Flynn | G06F 3/0643 |
| | | | 711/114 |

(Continued)

FOREIGN PATENT DOCUMENTS

| | | |
|---|---|---|
| CN | 101997884 A | 3/2011 |
| CN | 102024044 A | 4/2011 |

(Continued)

*Primary Examiner* — Edward J Dudek, Jr.
*Assistant Examiner* — Ralph A Verderamo, III
(74) *Attorney, Agent, or Firm* — Conley Rose, P.C.

(57) ABSTRACT

A distributed storage system including at least one storage node, and at least one object storage device (OSD) is deployed on the at least one storage node. At least one data processing device and at least one metadata processing device that has a mapping relationship with the at least one data processing device are deployed on the at least one OSD. A target data processing module of an input/output (IO) operation is configured to determine a target metadata processing device corresponding to the target data processing device and an identifier of an OSD in which the target metadata processing device is located, send an access operation to the target metadata processing device, and access data of the IO operation based on the IO operation. The target metadata processing device is configured to access metadata of the IO operation based on the access operation.

20 Claims, 13 Drawing Sheets

(56) References Cited

U.S. PATENT DOCUMENTS

| | | | |
|---|---|---|---|
| 2011/0066668 A1* | 3/2011 | Guarraci | G06F 16/27 707/831 |
| 2015/0254003 A1* | 9/2015 | Lee | G06F 12/0246 711/103 |
| 2016/0188591 A1 | 6/2016 | Bestler et al. | |
| 2017/0242767 A1 | 8/2017 | Wang et al. | |
| 2017/0277477 A1 | 9/2017 | Xi et al. | |

FOREIGN PATENT DOCUMENTS

| | | |
|---|---|---|
| CN | 103106207 A | 5/2013 |
| CN | 104123359 A | 10/2014 |
| CN | 104298574 A | 1/2015 |
| CN | 104598168 A | 5/2015 |
| CN | 105574104 A | 5/2016 |
| CN | 106713250 A | 5/2017 |
| CN | 107111481 A | 8/2017 |
| WO | 2013004136 A1 | 1/2013 |
| WO | 2016070375 A1 | 5/2016 |

* cited by examiner

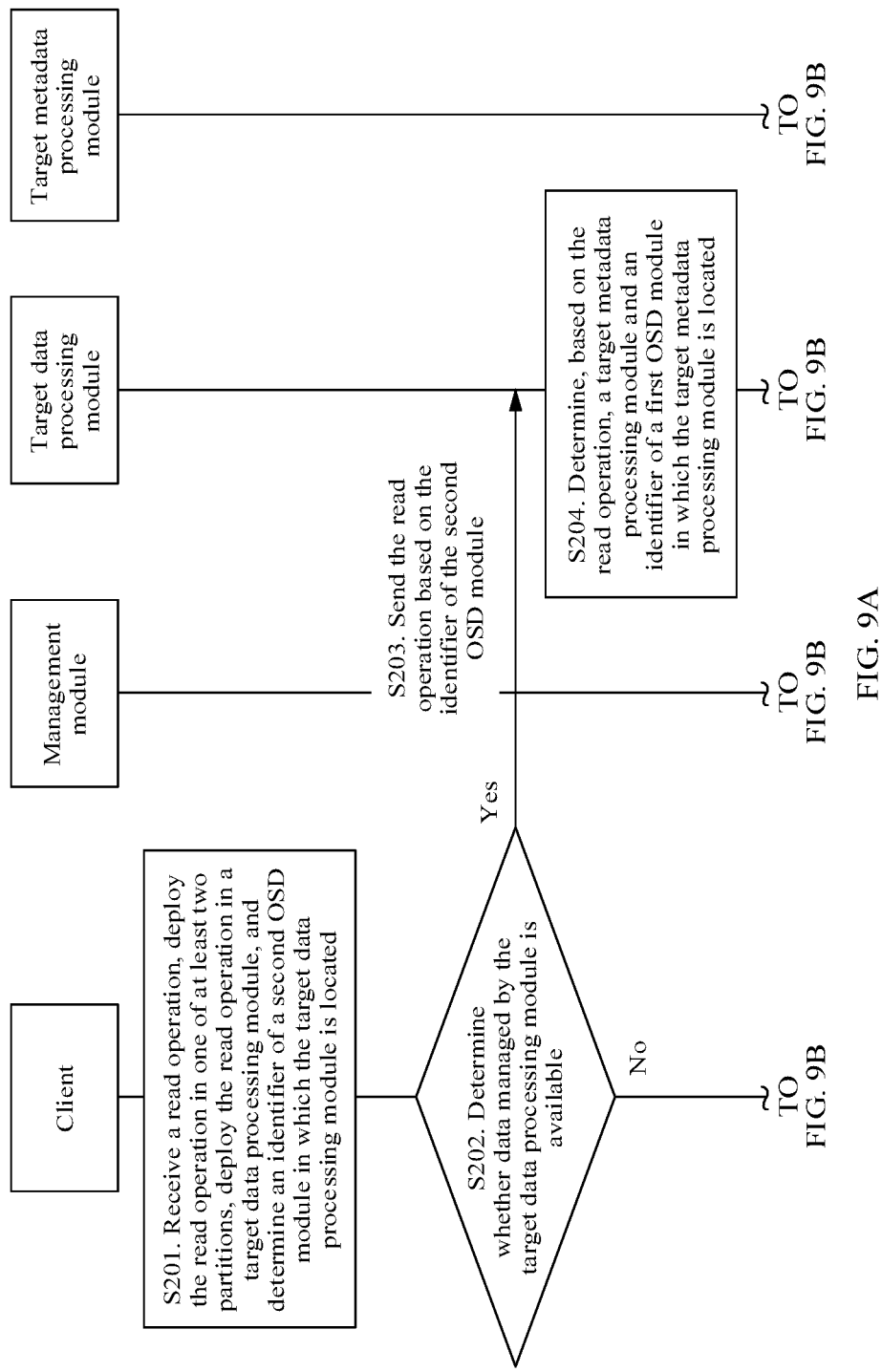

DISTRIBUTED STORAGE SYSTEM, DATA PROCESSING METHOD, AND STORAGE NODE

CROSS-REFERENCE TO RELATED APPLICATIONS

This application is a continuation of International Patent Application No. PCT/CN2018/104487 filed on Sep. 7, 2018, which claims priority to Chinese Patent Application No. 201810099610.X filed on Jan. 31, 2018. The disclosures of the aforementioned applications are hereby incorporated by reference in their entireties.

TECHNICAL FIELD

This application relates to the field of distributed technologies, and in particular, to a distributed storage system, a data processing method, and a storage node.

BACKGROUND

A distributed storage system such as CEPH, Cloud object storage system is a storage system in which data is dispersedly stored in a plurality of independent computer storage devices (namely, storage nodes). The distributed storage system includes at least one storage node, and a client and one or more object storage device (OSD) modules are deployed on the at least one storage node. Each OSD module may be deployed on one storage node, and the client may be deployed on any storage node. FIG. 1 is a schematic architectural diagram of a distributed storage system. The distributed storage system shown in FIG. 1 includes storage nodes 0, 1, 2, and 3. The distributed storage system includes a client and OSD modules 1 to 4. The client is deployed on the storage node 0, the OSD module 1 is deployed on the storage node 1, the OSD module 2 is deployed on the storage node 2, and the OSD modules 3 and 4 are deployed on the storage node 3.

A basic idea of data management in a conventional distributed storage system is as follows A fixed quantity of partitions are set in the distributed storage system. A client evenly allocates all pieces of received data of input/output (IO) operations to the partitions. There is a relatively fixed mapping relationship between each partition and one OSD module. That is, there is a mapping relationship between each partition and one specific OSD module within a specific time. Data of IO operations that belong to a same partition is stored in a storage node in which an OSD module that has a mapping relationship with the partition is located.

In the conventional distributed storage system, a hard disk drive (HDD) is used as a main storage medium, and an amount of metadata generated in a data storage process is relatively small. Therefore, it is relatively easy to manage data and metadata. Generally, data and metadata of one IO operation are managed by one OSD module. With development of storage technologies, for example, with diversification of storage media and/or increasing of metadata generated in a data storage process, the current distributed storage system cannot meet an overall performance requirement of the distributed storage system.

SUMMARY

Embodiments of this application provide a distributed storage system, a data processing method, and a storage node, to help improve overall performance of the distributed storage system.

According to a first aspect, an embodiment of this application provides a distributed storage system, where the distributed storage system includes at least one storage node, and at least one OSD module is deployed on the at least one storage node. At least one data processing module and at least one metadata processing module that has a mapping relationship with the at least one data processing module are deployed on the at least one OSD module. The target data processing module is configured to receive an IO operation, determine a target metadata processing module and an identifier of a first OSD module in which the target metadata processing module is located, and send an access operation to the target metadata processing module based on the identifier of the first OSD module. The target data processing module is a data processing module allocated by the distributed storage system to the IO operation. There is a mapping relationship between the target metadata processing module and the target data processing module. The target metadata processing module is configured to access metadata of the IO operation based on the access operation. The target data processing module is further configured to access data of the IO operation based on the IO operation. In this technical solution, the target data processing module accesses the data of the IO operation, and the target metadata processing module accesses the metadata of the IO operation. That is, the distributed storage system may separately manage the data and the metadata of the IO operation. Compared with a technical solution of performing unified management on metadata and data according to other approaches, this technical solution helps improve management performance of the distributed storage system, and helps improve overall performance of the distributed storage system. In addition, when the distributed storage system is deployed, each data processing module and each metadata processing module may be deployed separately.

In a possible design, The target data processing module is configured to determine, based on the mapping relationship between the data processing module and the metadata processing module, a target metadata processing module that has a mapping relationship with the target data processing module, and determine, based on a mapping relationship between the metadata processing module and the OSD module in which the metadata processing module is located, the identifier of the first OSD module in which the target metadata processing module is located. The possible design provides a specific implementation in which the target data processing module determines the target metadata processing module and determines the identifier of the first OSD module. Certainly, this application is not limited thereto. For a specific example, refer to a specific implementation part below.

In a possible design, the IO operation is a write operation, and the access operation is a write access operation. The write access operation carries metadata of the write operation. In this case, the target data processing module is further configured to write, based on the write operation, data of the write operation into a storage node in which the target data processing module is located, and generate the metadata of the write operation. The target metadata processing module is configured to write the metadata of the write operation into at least two storage nodes based on the write access operation. The possible design provides specific implementations of the target data processing module and the target metadata processing module in a process of performing the write operation. Certainly, this application is not limited thereto.

In a possible design, the IO operation is a read operation, and the access operation is a read access operation. In this case, the target metadata processing module is configured to read metadata of the read operation based on the read access operation, and send the metadata of the read operation to the target data processing module. The target data processing module is further configured to read data of the read operation based on the read operation and the metadata of the read operation. The possible design provides specific implementations of the target data processing module and the target metadata processing module in a process of performing the read operation.

In a possible design, the distributed storage system includes at least two OSD modules, and the first OSD module is different from an OSD module (namely, a second OSD module below) in which the target data processing module is located. In this way, it can be implemented that the distributed storage system separately manages data and metadata of a same IO operation in an OSD module, which helps improve management performance of the distributed storage system, thereby improving the overall performance of the distributed storage system. Certainly, in some embodiments, the first OSD module and the second OSD module may be a same OSD module.

In a possible design, there is a mapping relationship between each data processing module in the at least one data processing module and one metadata processing module of the at least one metadata processing module. That is, the data processing module is in a one-to-one correspondence with the metadata processing module. In this way, management is convenient. Certainly, this application is not limited thereto. For example, the data processing module and the metadata processing module may also be in a "one-to-many" or "many-to-one" relationship.

In a possible design, a management module is further deployed on the at least one OSD module, and there is a mapping relationship between the management module and the at least one data processing module. The management module is configured to manage data protection information of the IO operation. The data protection information includes erasure coding (EC) strip information or multi-copy information. It may be understood that the data protection information is related to a data storage manner. Herein, that the data storage manner is an EC strip storage manner or a multi-copy storage manner is used as an example for description. This application is not limited thereto. In this possible design, an independent management module is deployed on the OSD module, to manage the data protection information of the IO operation. In this way, the data protection information of the IO operation and the data and the metadata of the IO operation are separately managed, which helps improve the management performance of the distributed storage system, thereby improving the overall performance of the distributed storage system.

In a possible design, if the data of the IO operation is stored in the EC storage manner, a quantity of data processing modules that have a mapping relationship with the management module is a quantity of data blocks and parity blocks included in an EC strip.

In a possible design, if the data of the IO operation is stored in the multi-copy storage manner, a quantity of data processing modules that have a mapping relationship with the management module is a quantity of copies in the multi-copy data storage manner.

In a possible design, at least two partitions are set in the distributed storage system, and the partition is a set including the IO operation. In this case, the management module is configured to manage data protection information of an IO operation that belongs to one of the at least two partitions. The at least one data processing module is configured to manage data of an IO operation that belongs to one of the partitions. The at least one metadata processing module is configured to manage metadata of an IO operation that belongs to one of the partitions. Usually, a quantity of partitions is fixed. Certainly, this application is not limited thereto.

In a possible design, that the management module is configured to manage data protection information of an IO operation may include that the management module is configured to receive the IO operation, where the IO operation is a write operation, and calculate data protection information of the write operation. The possible design provides a specific implementation that the management module manages the data protection information in a process of performing the write operation.

In a possible design, that the management module is configured to manage data protection information of an IO operation may include that the management module is configured to receive the IO operation, where the IO operation is a read operation, obtain data protection information of the read operation, read, based on the data protection information, data that has a protection relationship with the data of the read operation, and reconstruct the data of the read operation based on the data that has the protection relationship with the data of the read operation. The possible design provides a specific implementation that the management module manages the data protection information in a process of performing the read operation.

In a possible design, the distributed storage system may further include a client configured to receive the IO operation, determine the management module and an identifier of a third OSD module in which the management module is located, and send the IO operation to the management module based on the identifier of the third OSD module. It may be understood that the distributed storage system may include a plurality of management modules. The client may be configured to receive an IO operation sent by a user or a device, and determine a management module for the IO operation. Certainly, this application is not limited thereto. The possible design may be applied to a scenario in which the IO operation is the write operation, or the IO operation is the read operation and data managed by the target data processing module is unavailable. For specific implementation, refer to the following specific implementations.

In a possible design, if the IO operation is the read operation, and the data managed by the target data processing module is available. Optionally, the client included in the distributed storage system may be configured to receive the read operation, determine the target data processing module and the identifier of the second OSD module in which the target data processing module is located, and send the read operation to the target data processing module based on the second OSD module. In this case, that the target data processing module may be configured to receive the IO operation includes that the target data processing module is configured to receive the read operation sent by the client.

In a possible design, if the IO operation is the write operation, the management module may be further configured to determine the target data processing module and the identifier of the second OSD module in which the target data processing module is located, and send the write operation to the target data processing module based on the identifier of the second OSD module. In this case, that the target data processing module is configured to receive the IO operation includes target data processing module is configured to receive the write operation sent by the management module.

According to a second aspect, an embodiment of this application provides a data processing method, applied to a distributed storage system. The distributed storage system may include at least one storage node, and at least one OSD module is deployed on the at least one storage node. At least one data processing module and at least one metadata processing module that has a mapping relationship with the at least one data processing module are deployed on the at least one OSD module. The method may include receiving, by a target data processing module, an IO operation, where the target data processing module is a data processing module allocated by the distributed storage system to the IO operation, determining, by the target data processing module, a target metadata processing module and an identifier of a first OSD module in which the target metadata processing module is located, where there is a mapping relationship between the target metadata processing module and the target data processing module, sending, by the target data processing module, an access operation to the target metadata processing module based on the identifier of the first OSD module, where the access operation is used to instruct the target metadata processing module to access metadata of the IO operation, and accessing, by the target data processing module, data of the IO operation.

In a possible design, the determining, by the target data processing module, a target metadata processing module and an identifier of a first OSD module in which the target metadata processing module is located may include determining, by the target data processing module, based on the mapping relationship between the data processing module and the metadata processing module, a target metadata processing module that has a mapping relationship with the target data processing module, and determining, by the target data processing module, based on a mapping relationship between the metadata processing module and the OSD module in which the metadata processing module is located, the identifier of the first OSD module in which the target metadata processing module is located.

In a possible design, the IO operation is a write operation, and the access operation is a write access operation. The write access operation includes metadata of the write operation. In this case, the accessing, by the target data processing module, data of the IO operation may include writing, by the target data processing module based on the write operation, data of the write operation into a storage node in which the target data processing module is located, and generating the metadata of the write operation.

In a possible design, the IO operation is a read operation, and the access operation is a read access operation. In this case, accessing, by the target data processing module, data of the IO operation may include receiving, by the target data processing module, metadata of the read operation sent by the target metadata processing module, and reading the data of the read operation based on the read operation and the metadata of the read operation.

According to a third aspect, an embodiment of this application provides a data processing method, applied to a distributed storage system. The distributed storage system includes at least one storage node, and at least one OSD module is deployed on the at least one storage node. At least one data processing module and at least one metadata processing module that has a mapping relationship with the at least one data processing module are deployed on the at least one OSD module. The method may include receiving, by a target metadata processing module, an access operation sent by a target data processing module, where the target data processing module is a data processing module allocated by the distributed storage system to the IO operation and is configured to access data of the IO operation, and there is a mapping relationship between the target metadata processing module and the target data processing module, and accessing, by the target metadata processing module, metadata of the IO operation based on the access operation.

In a possible design, the IO operation is a write operation, and the access operation is a write access operation. The write access operation carries metadata of the write operation. In this case, the accessing, by the target metadata processing module, metadata of the IO operation based on the access operation may include writing, by the target metadata processing module, the metadata of the write operation into at least two storage nodes based on the write access operation.

In a possible design, the IO operation is a read operation, and the access operation is a read access operation. In this case, accessing, by the target metadata processing module, metadata of the IO operation based on the access operation may include reading, by the target metadata processing module, metadata of the read operation based on the read access operation, and sending the metadata of the read operation to the target data processing module. The metadata of the read operation is used to instruct the target data processing module to read data of the read operation.

According to a fourth aspect, an embodiment of this application provides a data processing method, applied to a distributed storage system. The distributed storage system includes at least one storage node, at least one OSD module is deployed on the at least one storage node, and a management module, at least one data processing module that has a mapping relationship with the management module, and at least one metadata processing module that has a mapping relationship with the at least one data processing module are deployed on the at least one OSD module. The management module is configured to manage data protection information of an IO operation. The method may include receiving, by the management module, an IO operation, where the IO operation is a write operation, determining, by the management module, a target data processing module and an identifier of a second OSD module in which the target data processing module is located, where the target data processing module is a data processing module allocated by the distributed storage system to the IO operation, and sending, by the management module, the write operation to the target data processing module based on the identifier of the second OSD module, where the write operation is used to instruct the target data processing module to determine a target metadata processing module and an identifier of a first OSD module in which the target metadata processing module is located, and send a write access operation to the target metadata processing module based on the identifier of the first OSD module. There is a mapping relationship between the target metadata processing module and the target data processing module, the write access operation is used to instruct the target metadata processing module to read metadata of the write operation, and the target data processing module is further configured to read data of the write operation based on the metadata of the IO operation.

In a possible design, the method may further include calculating, by the management module, data protection information of the write operation.

In a possible design, the distributed storage system may further include a client. In this case, the receiving, by the management module, an IO operation may include receiving, by the management module, the write operation sent by the client.

According to a fifth aspect, an embodiment of this application provides a data processing method, applied to a distributed storage system. The distributed storage system includes at least one storage node, at least one OSD module is deployed on the at least one storage node, and a management module, at least one data processing module that has a mapping relationship with the management module, and at least one metadata processing module that has a mapping relationship with the at least one data processing module are deployed on the at least one OSD module. The management module is configured to manage data protection information of an IO operation. The method may include receiving, by the management module, an IO operation, where the IO operation is a read operation, obtaining, by the management module, data protection information of the read operation, reading, based on the data protection information, data that has a protection relationship with the data of the read operation, and reconstructing, by the management module, the data of the read operation based on the data that has the protection relationship with the data of the read operation.

In a possible design, the distributed storage system may further include a client. In this case, the receiving, by the management module, an IO operation may include receiving, by the management module, the read operation sent by the client. The method may further include sending, by the management module, the data of the read operation to the client.

According to a sixth aspect, an embodiment of this application provides a data processing apparatus. The data processing apparatus may be configured to perform any method provided in the second aspect. Optionally, the data processing apparatus may be further the target data processing module described in the second aspect. Optionally, the data processing apparatus may be the storage node including the target data processing module described in the second aspect.

In a possible design, function module division may be performed on the data processing apparatus according to the method provided in the second aspect. For example, each function module may be obtained through division based on each corresponding function, or two or more functions may be integrated into one processing module.

In a possible design, the data processing apparatus may be the storage node including the target data processing module described in the second aspect. The storage node may include a memory and a processor, where the memory is configured to store a computer program. The processor is configured to invoke the computer program to implement a function of the target data processing module. For the function of the target data processing module, refer to the second aspect.

According to a seventh aspect, an embodiment of this application provides a data processing apparatus. The data processing apparatus may be configured to perform any method provided in the third aspect. Optionally, the data processing apparatus may be the target metadata processing module described in the third aspect. Optionally, the data processing apparatus may be a storage node including the target data processing module described in the third aspect.

In a possible design, function module division may be performed on the data processing apparatus according to the method provided in the third aspect. For example, each function module may be obtained through division based on each corresponding function, or two or more functions may be integrated into one processing module.

In a possible design, the data processing apparatus may be a storage node including the target data processing module described in the third aspect. The storage node may include a memory and a processor, where the memory is configured to store a computer program. The processor is configured to invoke the computer program to implement a function of the target metadata processing module. For a function of the target metadata processing module, refer to the third aspect.

According to an eighth aspect, an embodiment of this application provides a data processing apparatus. The data processing apparatus may be configured to perform any method provided in the fourth aspect or the fifth aspect. Optionally, the data processing apparatus may be the management module described in the fourth aspect or the fifth aspect. Optionally, the data processing apparatus may be the storage node including the management module described in the fourth aspect or the fifth aspect.

In a possible design, function module division may be performed on the storage node according to the method provided in the fourth aspect or the fifth aspect. For example, each function module may be obtained through division based on each corresponding function, or two or more functions may be integrated into one processing module.

In a possible design, the data processing apparatus may be a storage node including the management module described in the fourth aspect or the fifth aspect. The storage node may include a memory and a processor, where the memory is configured to store a computer program. The processor is configured to invoke the computer program to implement a function of the management module. For a function of the management module, refer to the fourth aspect or the fifth aspect.

An embodiment of this application further provides a processing apparatus configured to implement a function of the foregoing apparatus (for example, any data processing apparatus provided in the sixth aspect to the eighth aspect). The processing apparatus includes a processor and an interface. The processing apparatus may be a chip, and the processor may be implemented by hardware or software. When the processing apparatus is implemented by hardware, the processor may be a logic circuit, an integrated circuit, or the like. When the processor is implemented by software, the processor may be a general-purpose processor, and is implemented by reading software code stored in a memory. The memory may be integrated into the processor, and may separately exist outside the processor.

An embodiment of this application further provides a computer-readable storage medium. The computer-readable storage medium stores a computer program. When the computer program is run on a computer, the computer performs any possible method in the second aspect.

An embodiment of this application further provides a computer-readable storage medium. The computer-readable storage medium stores a computer program. When the computer program is run on a computer, the computer performs any possible method in the third aspect.

An embodiment of this application further provides a computer-readable storage medium. The computer-readable storage medium stores a computer program. When the computer program is run on a computer, the computer performs any possible method in the fourth aspect or the fifth aspect.

An embodiment of this application further provides a computer program product. When the computer program product is run on a computer, any method provided in the second aspect is performed.

An embodiment of this application further provides a computer program product. When the computer program product is run on a computer, any method provided in the third aspect is performed.

An embodiment of this application further provides a computer program product. When the computer program product is run on a computer, any method provided in the fourth aspect or the fifth aspect is performed.

It may be understood that any method, apparatus, computer storage medium, computer program product, or the like provided above is used to perform the corresponding distributed storage system provided above. Therefore, for beneficial effects that can be achieved by the method or apparatus, the computer storage medium, the computer program product, or the like, refer to beneficial effects of the corresponding method. Details are not described herein again.

BRIEF DESCRIPTION OF DRAWINGS

FIG. 9A and FIG. 9B are schematic flowcharts of a data processing method according to an embodiment of this application;

DESCRIPTION OF EMBODIMENTS

Figure 1:
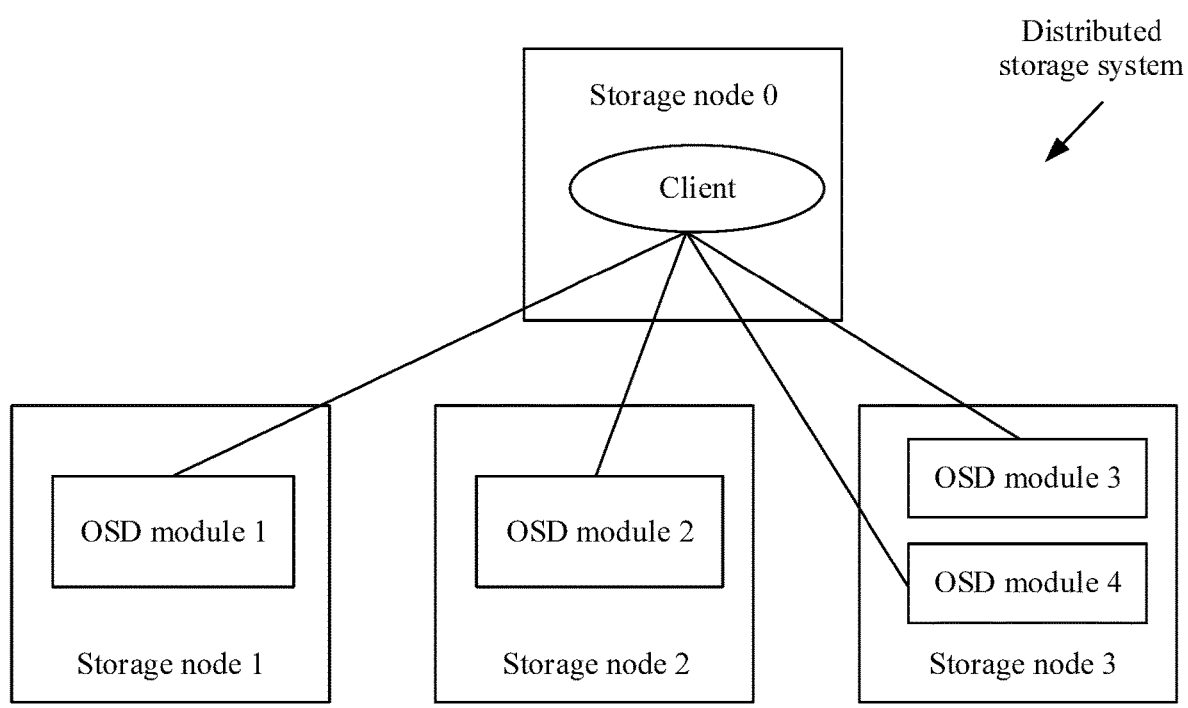
FIG. 1 is a schematic architectural diagram of a distributed storage system.

In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in description of this application, the term "a plurality of" means two or more than two unless otherwise specified. In addition, to clearly describe the technical solutions in the embodiments of this application, terms such as "first" and "second" are used in the embodiments of this application to distinguish between same items or similar items that have basically the same functions or purposes. A person skilled in the art may understand that the terms, such as "first" and "second", are not intended to limit a quantity or an execution sequence, and the terms, such as "first" and "second", do not indicate a definite difference.

With development of storage technologies, for example, with diversification of storage media and development of data storage manners, a conventional distributed storage system cannot meet an overall system performance requirement. For example, in the distributed storage system, there may be a scenario in which some storage media are HDDs and some storage media are solid-state drives (SSD). In this scenario, data and metadata are managed based on the conventional distributed storage system. If both metadata that requires low delay access and large volume data that requires high bandwidth access are stored in the HDD, access performance of the metadata is affected. Alternatively, if the metadata and the large volume data are stored in the SSD, a storage cost of the large volume data increases. For another example, to ensure data reliability, data storage manners such as an EC strip storage manner and a multi-copy storage manner are proposed in the industry, and therefore an amount of metadata generated in a data storage process is relatively large, and the metadata accounts for a very large proportion of a total amount of data. In this case, if the metadata is stored based on the conventional distributed storage system, system performance cannot be significantly improved.

Based on this, this application provides a distributed storage system, a data processing method, and a storage node. Basic principles thereof are as follows: Modules (such as a management module, a data processing module, and a metadata processing module) that have different functions are deployed on an OSD module such that data and metadata of an IO operation can be separately deployed and managed. This helps improve overall system performance. The OSD module may be considered as an OSD process. The management module, the data processing module, and the metadata processing module may be all considered as threads that have different functions.

The following describes technical solutions provided in this application with reference to the accompanying drawings using examples.

Figure 2:
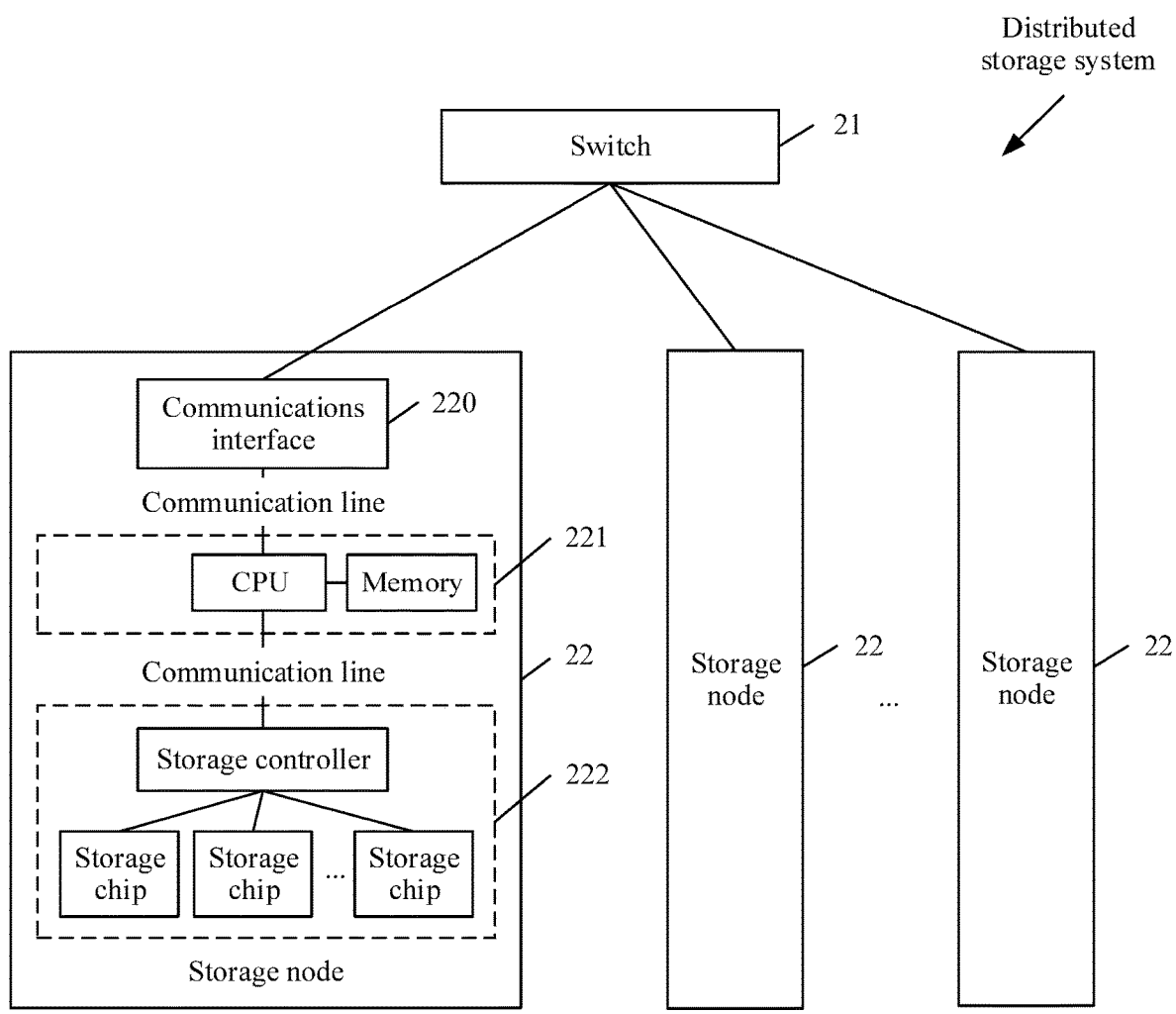
FIG. 2 is a schematic architectural diagram of a distributed storage system according to an embodiment of this application.

FIG. 2 is a schematic architectural diagram of a distributed storage system according to an embodiment of this application. In FIG. 2, the distributed storage system may include a switch 21 and at least one storage node 22. Storage nodes 22 are connected to each other using the switch 21. For example, the switch 21 may be but is not limited to an Ethernet switch, an INFINIBAND (IB) switch, or a Peripheral Component Interconnect Express (PCIe) switch. It may be understood that the distributed storage system shown in FIG. 2 is merely an example. During actual implementation, a plurality of storage nodes may also directly communicate with each other, or may communicate with each other using another device. This is not limited in this application.

The storage node 22 is a core component that is in the distributed storage system and that provides an IO processing capability and storage space.

Optionally, the storage node 22 may include a communications interface 220, an execution module 221, and one or more storage modules 222 connected to the execution module 221. The communications interface 220 may be connected to the execution module 221 using a communication line, and the execution module 221 may also be connected to the storage module 222 using a communication line. The communication line may include a channel for information transmission between the foregoing components. The communication line may also be referred to as an IO bus, and may be further, for example, but is not limited to a quick PCIe.

The communications interface 220 may be any apparatus such as a transceiver, and is configured to communicate with another device or a communications network (such as Ethernet or a wireless local area network (WLAN)).

The execution module 221 is responsible for inputting and outputting an IO operation (including a read/write operation) and executing a related processing procedure. The execution module 221 may include at least one processor. The at least one processor may be further connected to a specific quantity of memories.

The processor may be a general-purpose central processing unit (CPU), a microprocessor, an application-specific integrated circuit (ASIC), or one or more integrated circuits configured to control execution of a program in the solutions of this application. The communications interface 220 may be connected to the processor using a communication line. It should be noted that, during physical implementation, the processor, the communication line, and all or a part of the communications interface herein may be integrated together, or certainly may be disposed separately. This is not limited in this application. The memory may be configured to store a computer program for executing the solutions of this application, and execution of the computer program is controlled by the processor. The processor is configured to execute the computer program stored in the memory, to implement a method provided in the following embodiments of this application. Optionally, the computer program in the embodiments of this application may also be referred to as application program code, a computer executable instruction, or the like. This is not limited in the embodiments of this application.

The storage module 222 may include at least one storage controller, and a plurality of storage chips connected to each storage controller. The storage chip may be a NandFlash chip, or may be another non-volatile storage chip such as a phase-change memory (PCM), a magnetic random-access memory (MRAM), or a resistive RAM (RRAM). The storage controller may be an ASIC chip, or may be a field-programmable gate array (FPGA). A physical form of the storage module 222 herein may be an SSD, or may be an HDD. During actual implementation, all storage modules 222 in one storage node 22 may be SSDs, or may be HDDs. Alternatively, some of the storage modules 222 may be SSDs, and the other storage modules 222 may be HDDs. This is not limited in this application.

Optionally, the distributed storage system may further include a client (which may also be referred to as a client process) 10 and one or more OSD modules 20. Each of the one or more OSD modules 20 may include at least one of the following modules: one or more management modules (which may also be referred to as one or more management processing modules) 201, at least one data processing module 202 that has a mapping relationship with each management module 201, and at least one metadata processing module 203 that has a mapping relationship with the at least one data processing module 202. Each processing module (including the management module 201, the data processing module 202, and the metadata processing module 203) may be included in one OSD module 20. Different processing modules may be included in a same OSD module 20, or may be included in different OSD modules 20.

It should be noted that, in this application, that the OSD module 20 includes (or has) a specific processing module (for example, the management module 201, the data processing module 202, or the metadata processing module 203) is equivalent to that the processing module is deployed on the OSD module 20. A unified description is provided herein. Details are not described below.

Figure 3:
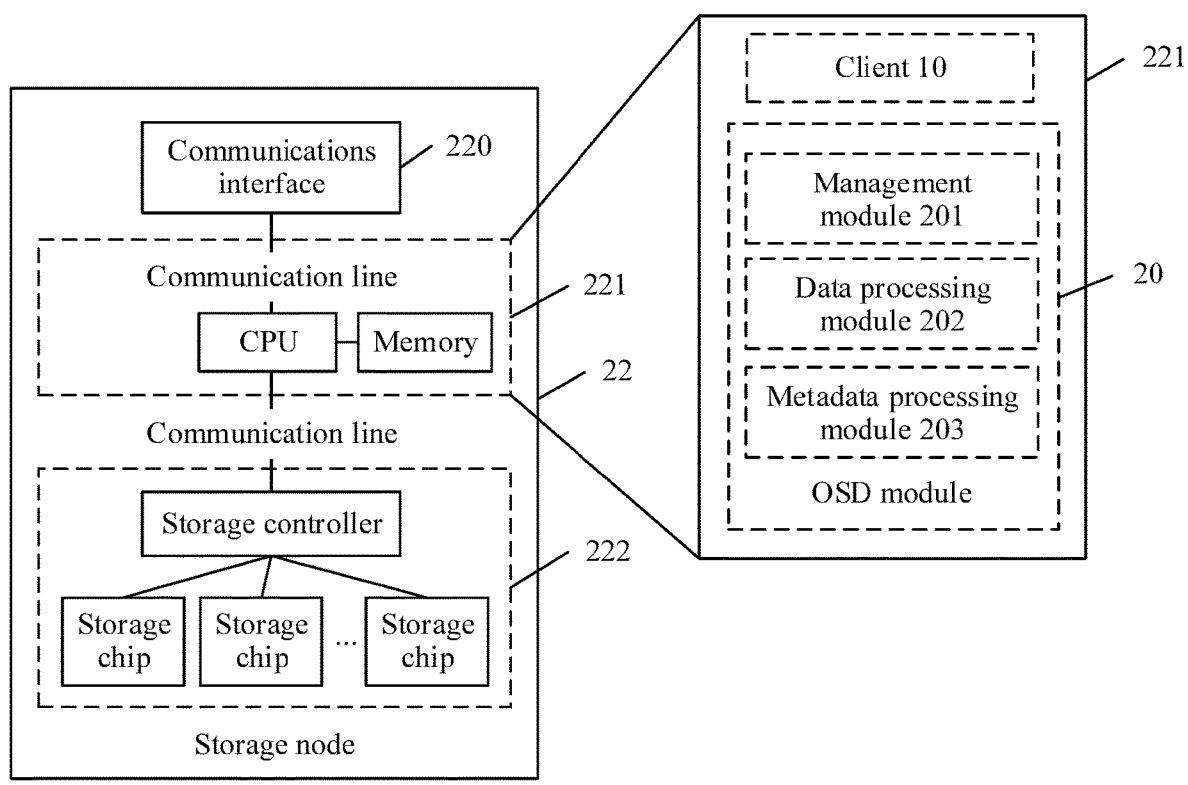
FIG. 3 is a schematic structural diagram of a storage node according to an embodiment of this application.

Some or all of the client 10, the management module 201, the data processing module 202, and the metadata processing module 203 may be stored in a memory (for example, the memory in FIG. 2) in a form of a computer program. A processor (for example, the CPU in FIG. 2) may invoke the computer program to implement a function implemented by at least one of the client 10, the management module 201, the data processing module 202, and the metadata processing module 203. A schematic diagram thereof is shown in FIG. 3.

Figure 4:
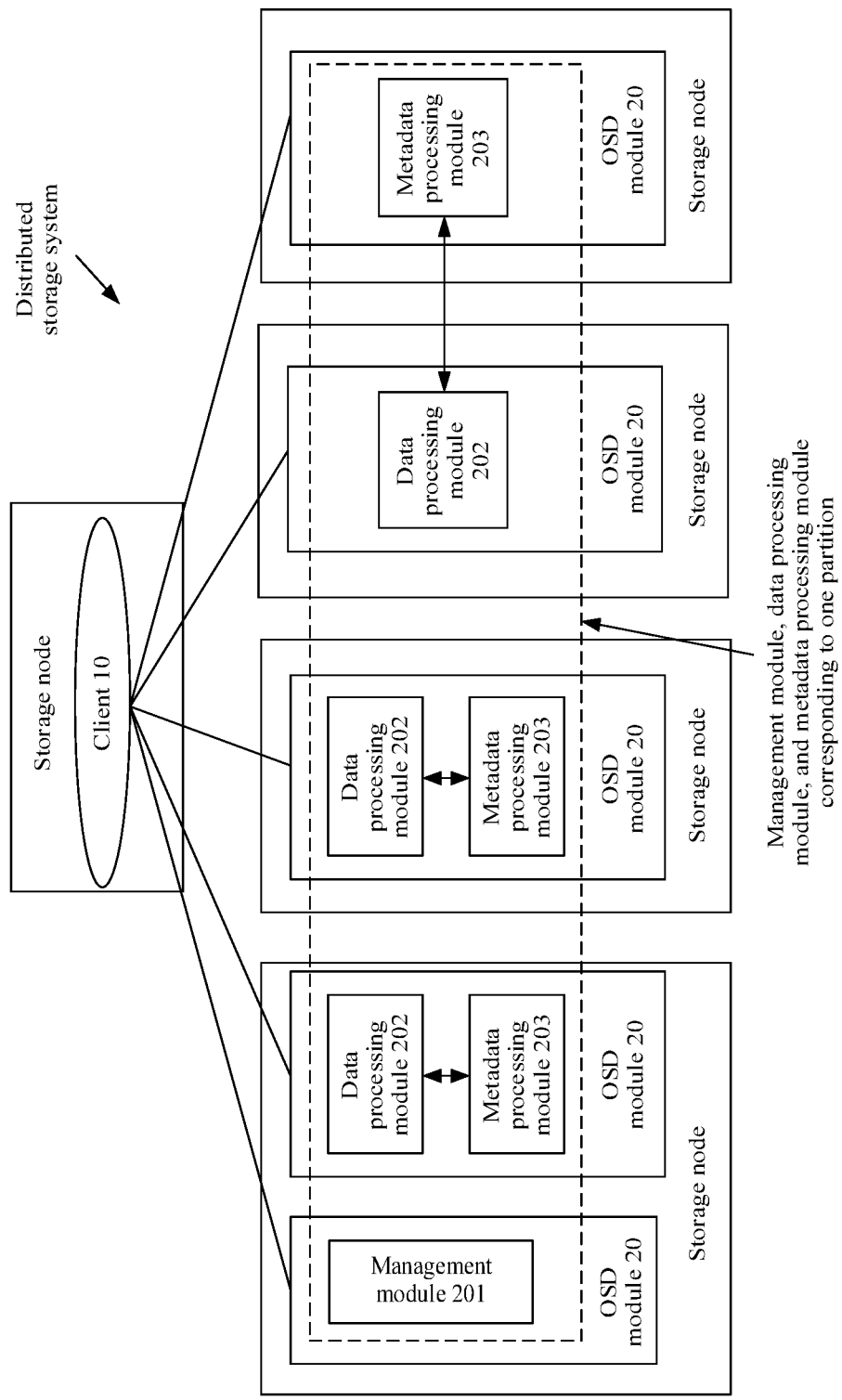
FIG. 4 is a schematic architectural diagram of a distributed storage system according to an embodiment of this application.

In a specific implementation process, each OSD module 20 may be deployed on one storage node 22, and different OSD modules 20 may be deployed on a same storage node 22, or may be deployed on different storage nodes 22. The client 10 and any OSD module 20 may be deployed on a same storage node 22, or may be separately deployed on a storage node 22. FIG. 4 is a schematic architectural diagram of another distributed storage system according to an embodiment of this application. For brevity, FIG. 4 does not show a communications interface, a processor, a communication line, a storage module, and the like in a storage node 22. A double-headed arrow in FIG. 4 indicates that there is a mapping relationship between a data processing module 202 and a metadata processing module 203.

In some embodiments of this application, there is a mapping relationship between each data processing module 202 and one metadata processing module 203. That is, the data processing module 202 is in a one-to-one correspondence with the metadata processing module 203.

In some embodiments of this application, at least two partitions may be set in the distributed storage system. The partition is a set including an IO operation. Each partition may have a mapping relationship with the following processing modules: a management module 201, at least one data processing module 202 that has a mapping relationship with the management module 201, and a metadata processing module 203 that has a mapping relationship with each data processing module 202, as shown in FIG. 4. A dashed-line box in FIG. 4 indicates modules (including the management module 201, the data processing module 202, and the metadata processing module 203) corresponding to one partition.

Based on FIG. 4, the client 10 may be configured to receive an IO operation and attribute the IO operation to one of the at least two partitions. Then, the IO operation is sent to a management module 201 that has a mapping relationship with the partition.

The management module 201 may be configured to manage data protection information of the IO operation that belongs to the partition. The data protection information is related to a data storage manner. For example, if the data storage manner is an EC strip storage manner, the data protection information may be EC strip information. In this case, the management module 201 may be configured to manage EC strip information generated based on data of the IO operation that belongs to the partition. The EC strip information may include, for example, but is not limited to, a specific data block and a specific parity block that are used to establish an EC strip, and the like. For another example, if the data storage manner is a multi-copy storage manner, the data protection information may be multi-copy information. In this case, the management module 201 may be configured to manage multi-copy information generated based on data of the IO operation that belongs to the partition. The multi-copy information may include, for example, but is not limited to, a specific data block that is used as a duplicate data block of a data block, and the like. A data storage manner is not limited in this application.

Each data processing module 202 that has a mapping relationship with the management module 201 is configured to manage data of an IO operation that belongs to one partition and that is allocated to the data processing module 202. Optionally, the client 10 or the management module 201 may allocate one IO operation to a data processing module 202.

A metadata processing module 203 that has a mapping relationship with each data processing module 202 is configured to manage metadata of the IO operation that belongs to the partition and that is allocated to the data processing module 202. Optionally, the client 10, the management module 201, or the data processing module 202 may allocate one IO operation to a metadata processing module 203.

In this application, an IO operation may be a write operation or a read operation. The write operation may carry a to-be-written logical block address (LBA) and to-be-written data, which are used to write the to-be-written data into physical storage space corresponding to the to-be-written LBA. The read operation may carry the to-be-read LBA, which is used to read data (namely, to-be-read data) stored in physical storage space corresponding to the to-be-read LBA. If the IO operation is the write operation, data of the IO operation is to-be-written data carried in the IO operation. If the IO operation is the read operation, data of the IO operation is data to be read by the IO operation (namely, to-be-read data). The metadata of the IO operation is metadata generated in a process of writing the data of the IO operation. Metadata is data about data that describes the IO operation, which is mainly information that describes property of data, and may be used to support functions such as storage location indication, historical data, resource searching, and file recording.

It may be understood that the distributed storage system shown in FIG. 4 is merely an example, and does not constitute a limitation on the distributed storage system provided in this application. For example, the distributed storage system may include one or more clients 10, and each client 10 may communicate with any OSD module 20. For example, each partition may have a mapping relationship with one or more management modules 201.

In some embodiments of this application, a quantity of data processing modules 202 that have a mapping relationship with one partition is related to a data storage manner of the distributed storage system. A manner of storing data of the IO operation may be the EC strip storage manner or the multi-copying storage manner, or the like. For example, if the data of the IO operation is stored in the EC strip storage manner, the quantity of data processing modules 202 that have the mapping relationship with one partition may be a quantity of data blocks and parity blocks included in an EC strip. For example, assuming that one EC strip includes three data blocks and two parity blocks, the quantity of data processing modules 202 that have the mapping relationship with one partition may be five. For example, if the data of the IO operation is stored in the multi-copy storage manner, the quantity of data processing modules 202 that have the mapping relationship with one partition may be a quantity of data blocks and copy data blocks that have a multi-copy relationship. For example, if a data block that has the multi-copy relationship has three duplicate data blocks, the quantity of data processing modules 202 that have the mapping relationship with one partition may be four.

It may be understood that, to ensure data reliability, in the EC strip storage manner or the multi-copy storage manner, the data processing modules 202 that have the mapping relationship with one partition are deployed on OSD modules 20 of different storage nodes. For example, in FIG. 4, a plurality of data processing modules 202 that have a mapping relationship with a same partition are deployed on OSD modules 20 of different storage nodes. In this way, when a storage node is faulty, data of an IO operation stored in the faulty storage node may be recovered using data of an IO operation stored in another storage node, thereby helping improve the data reliability.

Figure 5:
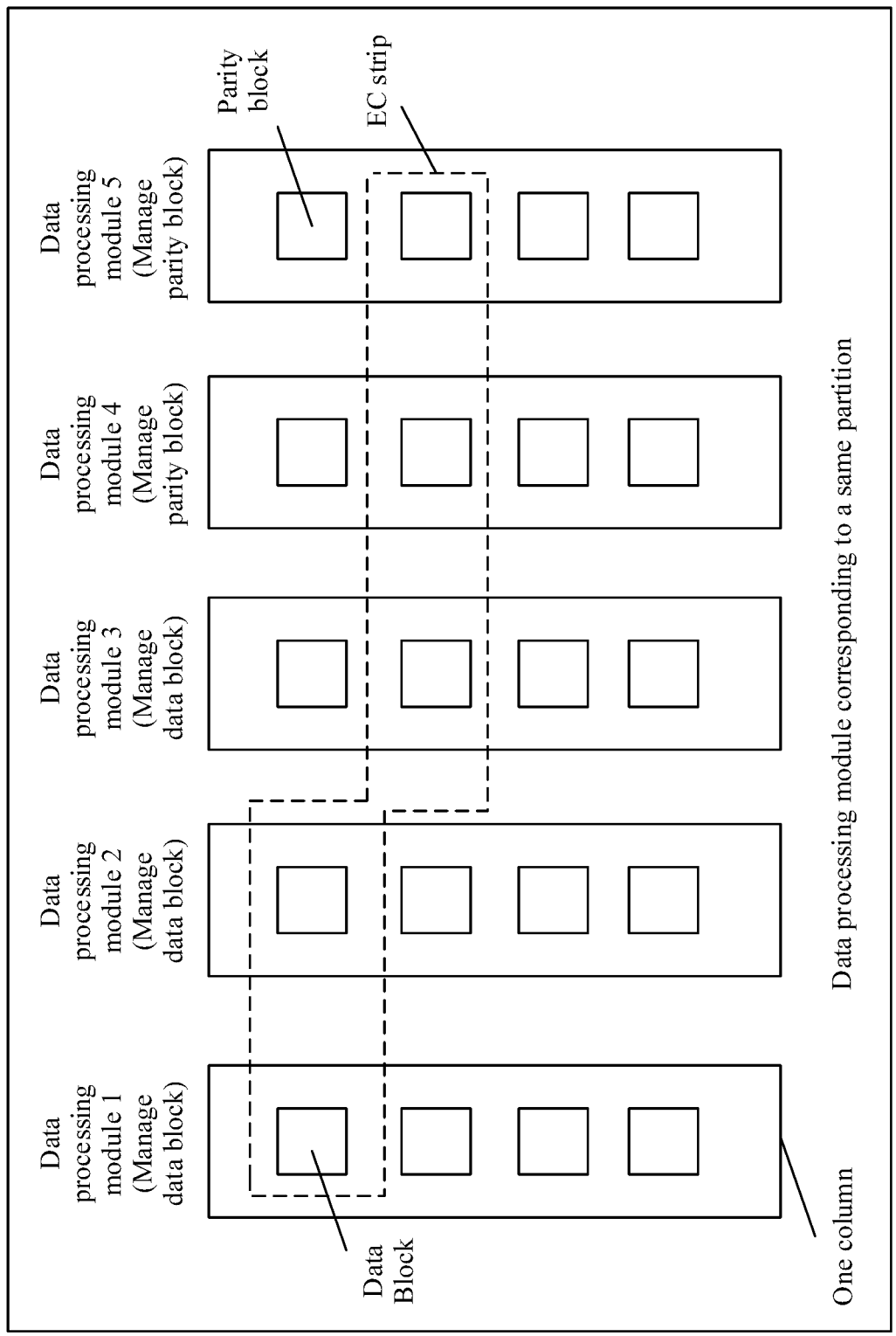
FIG. 5 is a schematic diagram of a data processing module corresponding to a partition according to an embodiment of this application.

In an example in which the data of the IO operation is stored in the EC strip storage manner, a data processing module 202 that has a mapping relationship with one partition may be a data processing module configured to manage a data block or a data processing module configured to manage a parity block. The data block is a basic unit for storing data by the storage node. The parity block is parity data obtained after the management module 201 checks data blocks belonging to a same EC strip. If the quantity of data processing modules 202 that have the mapping relationship with one partition is a quantity of data blocks and parity blocks included in an EC strip, the EC strip may include as shown in FIG. 5, one data block managed by each data processing module configured to manage a data block in the partition and one parity block managed by each data processing module configured to manage a parity block. In FIG. 5, an example in which data processing modules 202 that have a mapping relationship with one partition is marked as the data processing modules 1 to 5, the data processing modules 1 to 3 are data processing modules configured to manage a data block, and the data processing modules 4 to 5 are data processing modules configured to manage a parity block is used for description. Each data processing module 202 is configured to manage one column of an EC strip, and each column includes a plurality of data blocks/parity blocks. In FIG. 5, an example in which each column includes four data blocks/parity blocks is used for description. A small box in each data processing module represents a data block or a parity block belonging to the data processing module. In FIG. 5, a small box in each data processing module configured to manage a data block represents a data block, and a small box in each data processing module configured to manage a parity block represents a parity block. In FIG. 5, data blocks and parity blocks included in a dashed line box establish one EC strip. Similar to this, it may be obtained that in a case in which the data of the IO operation is stored in the multi-copy storage manner, a correspondence between a data block and a duplicate data block that have a multi-copy relationship and a data processing module may be obtained. Details are not described herein again.

Figure 6:
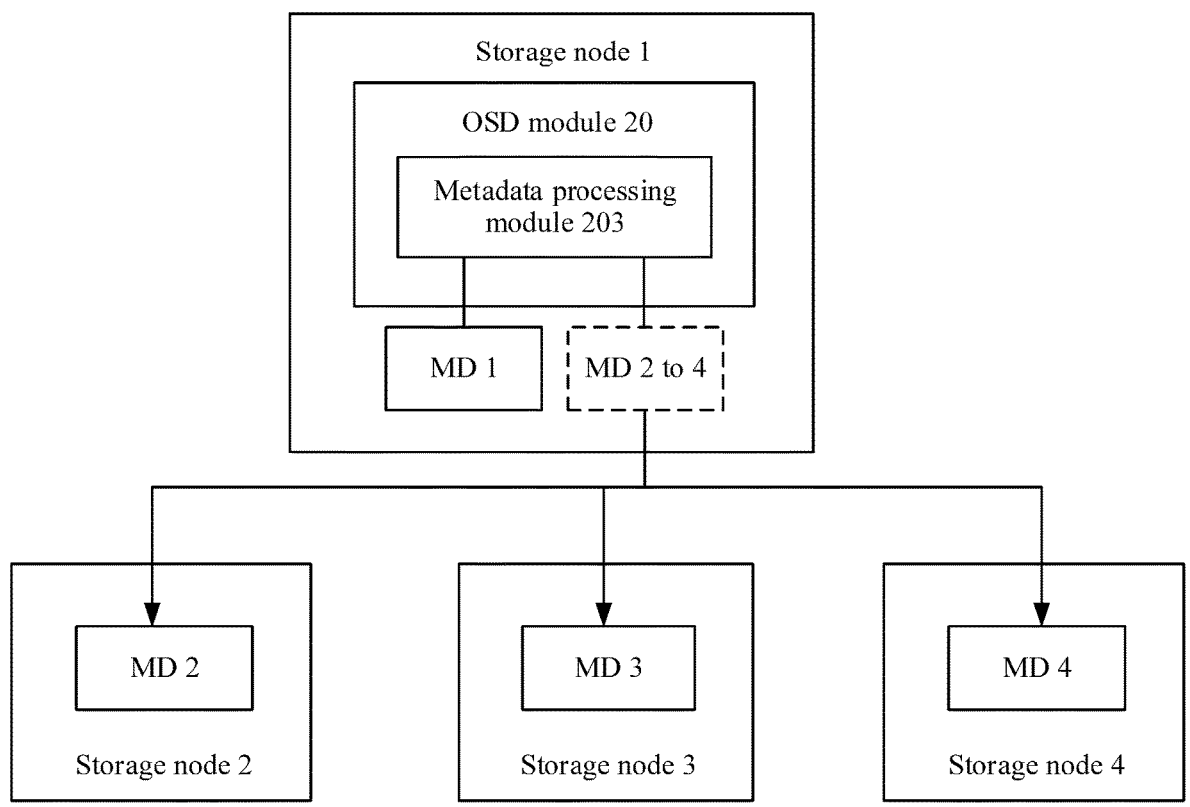
FIG. 6 is a schematic diagram of setting data protection for metadata according to an embodiment of this application.

In the foregoing technical solution, reliability protection of data of an IO operation is described. In some embodiments of this application, reliability protection may be further performed on metadata of an IO operation. Further, one metadata processing module 203 may distribute, to a plurality of storage nodes for storage, metadata managed by the metadata processing module 203. A storage manner of the metadata of the IO operation may be, for example, but is not limited to, an EC strip storage manner or a multi-copying storage manner. FIG. 6 is an implementation of setting data protection for metadata. In FIG. 6, a metadata processing module 203 is deployed on the storage node 1, and manages metadata MD 1 to 4. The MD 1 is stored locally, that is, a storage node 1, the MD 2 is stored in a storage node 2, the MD 3 is stored in a storage node 3, and the MD 4 is stored in a storage node 4. A relationship between MD 1 to 4 may be that one EC strip is jointly established, or may be a multi-copy relationship. Similar to this, in some embodiments of this application, a management module 201 may also perform reliability protection on data (for example, data protection information of an IO operation) managed by the management module 201. Details are not described herein again.

Figure 7:
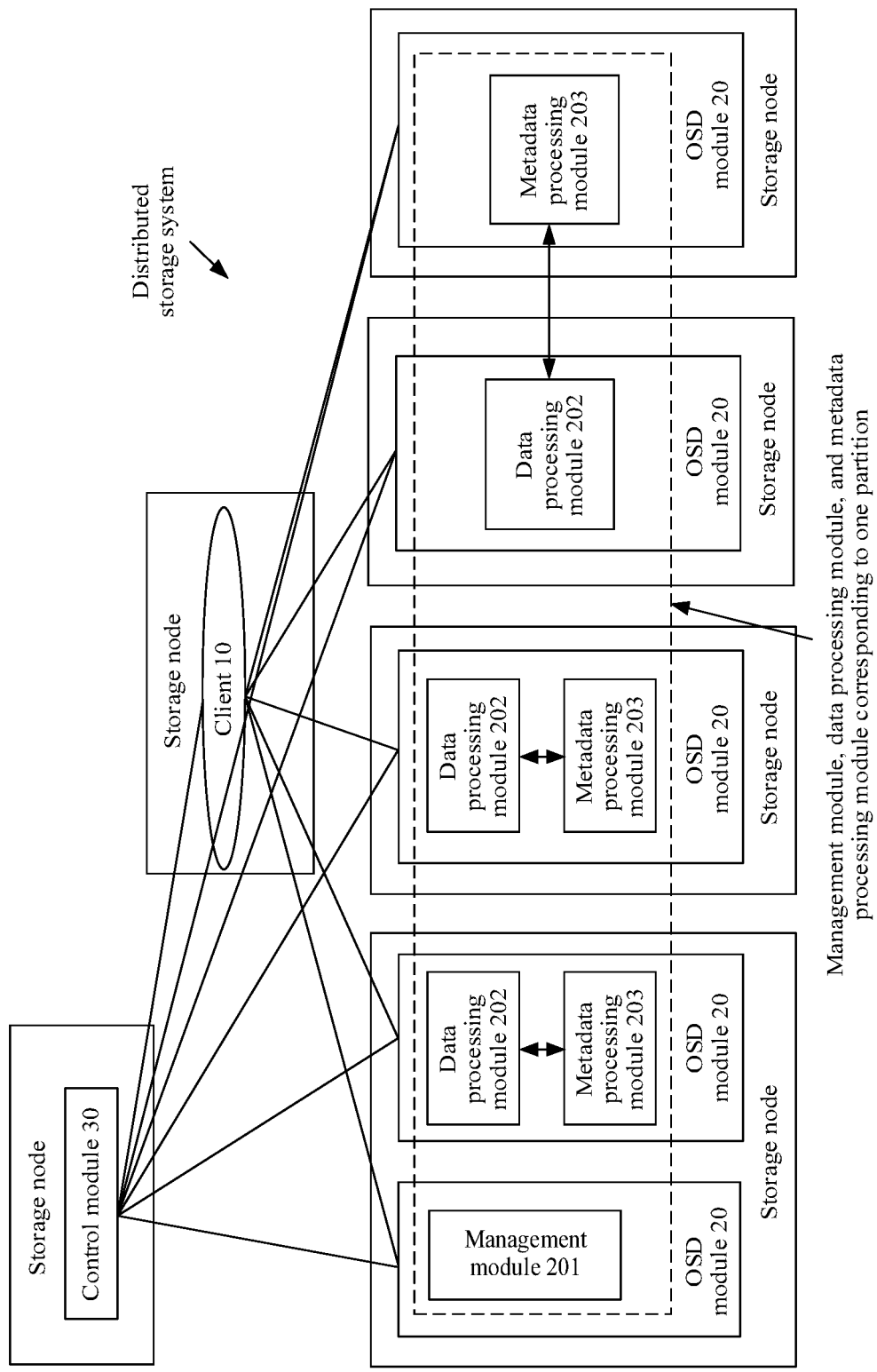
FIG. 7 is a schematic architectural diagram of a distributed storage system according to an embodiment of this application.

In some embodiments of this application, as shown in FIG. 7, a distributed storage system may further include a control module 30. The control module 30 may be deployed on any storage node. In FIG. 6, an example in which the control module 30 is separately deployed on one storage node, that is, the control module 30 and a client 10 and/or each OSD module 20 are not deployed on a same storage node is used for description. The control module 30 is configured to manage heartbeats of the client 10 and each OSD module 20, and manage a partition and a processing module (including a management module 201, a data processing module 202, and a metadata processing module 203) in the distributed storage system, and the like. That the control module 30 manages the heartbeat of the client 10 or each OSD module 20 may be understood as that the control module 30 detects, by sending a heartbeat message to the client 10 or each OSD module, whether the client 10 or each OSD module is faulty. That the control module 30 manages the partition and the processing module in the distributed storage system may include, for example, but is not limited to the following The control module 30 manages a total quantity of partitions, a quantity of management modules 201, a quantity of data processing modules 202, and a quantity of metadata processing modules 203 that have a mapping relationship with each partition, a mapping relationship between processing modules, a mapping relationship between a partition and each processing module, a mapping relationship between each processing module and an OSD module 20 in which each processing module is located, a mapping relationship between the OSD module 20 and a storage node in which the OSD module 20 is located, and the like. In addition, in an embodiment of performing data protection on metadata, the control module 30 may be further configured to manage a mapping relationship between each column in an EC strip and a storage node. In addition, the control module 30 may be further configured to synchronize updated information to the client 10 and the OSD module 20 after the foregoing information is updated, and synchronize the foregoing information to the client 10 and/or the OSD module 20 after the client 10 is started and/or the OSD module 20 is started, and the like.

Generally, before an IO operation is performed, a distributed storage system needs to be constructed first. Further, the client 10, the OSD module 20, and the control module 30 are deployed on a storage node of the distributed storage system based on the configuration file, and one or more processing modules of each management module 201, the data processing module 202, and the metadata processing module 203 are deployed on the OSD module 20. The configuration file may be used to record a total quantity of partitions in the distributed storage system, a quantity of management modules 201, a quantity of data processing modules 202, and a quantity of metadata processing modules 203 that have a mapping relationship with each partition, an allocation algorithm, and the like. The allocation algorithm may be used by the control module 30 to establish at least one of the following mapping relationships a mapping relationship between each processing module and an OSD module 20 in which the processing module is located, a mapping relationship between each OSD module 20 and a storage node in which the OSD module is located, and a mapping relationship between a metadata processing module 203 and a storage node in which metadata managed by the metadata processing module 203 is located, a mapping relationship between a management module 201 and a storage node in which data managed by the management module 201 is located, and the like. The allocation algorithm may be, for example, but is not limited to, an allocation algorithm determined based on factors such as a type of a storage medium, an available capacity of a storage node, and load balancing between storage nodes. For example, the control module 30 may deploy the data processing module 202 in an HDD based on the allocation algorithm, to reduce storage costs of large volume data, and deploy the metadata processing module 203 in an SSD, to reduce an access delay of metadata, and further help improve overall performance of a system. For example, the control module 30 may deploy a same quantity of OSD modules 20/processing modules in each storage node as far as possible based on the allocation algorithm, to help improve the overall performance of the system, and the like.

Optionally, any process/thread in the foregoing processes/threads (for example, the client 10, the OSD module 20, the management module 201, the data processing module 202, the metadata processing module 203, and the control module 30) may be implemented by one device, or may be jointly implemented by a plurality of devices, or may be a function module in one device. This is not limited in this embodiment of this application. It may be understood that the foregoing functions may be network elements in a hardware device, or may be software functions run on dedicated hardware, or may be instantiated virtualization functions on a platform (for example, a cloud platform). In an example, a schematic structural diagram of a device for implementing any one of the foregoing processes/threads may be the storage node shown in FIG. 2.

The following describes the data processing method provided in this application with reference to FIG. 2 to FIG. 7.

Figure 8A:
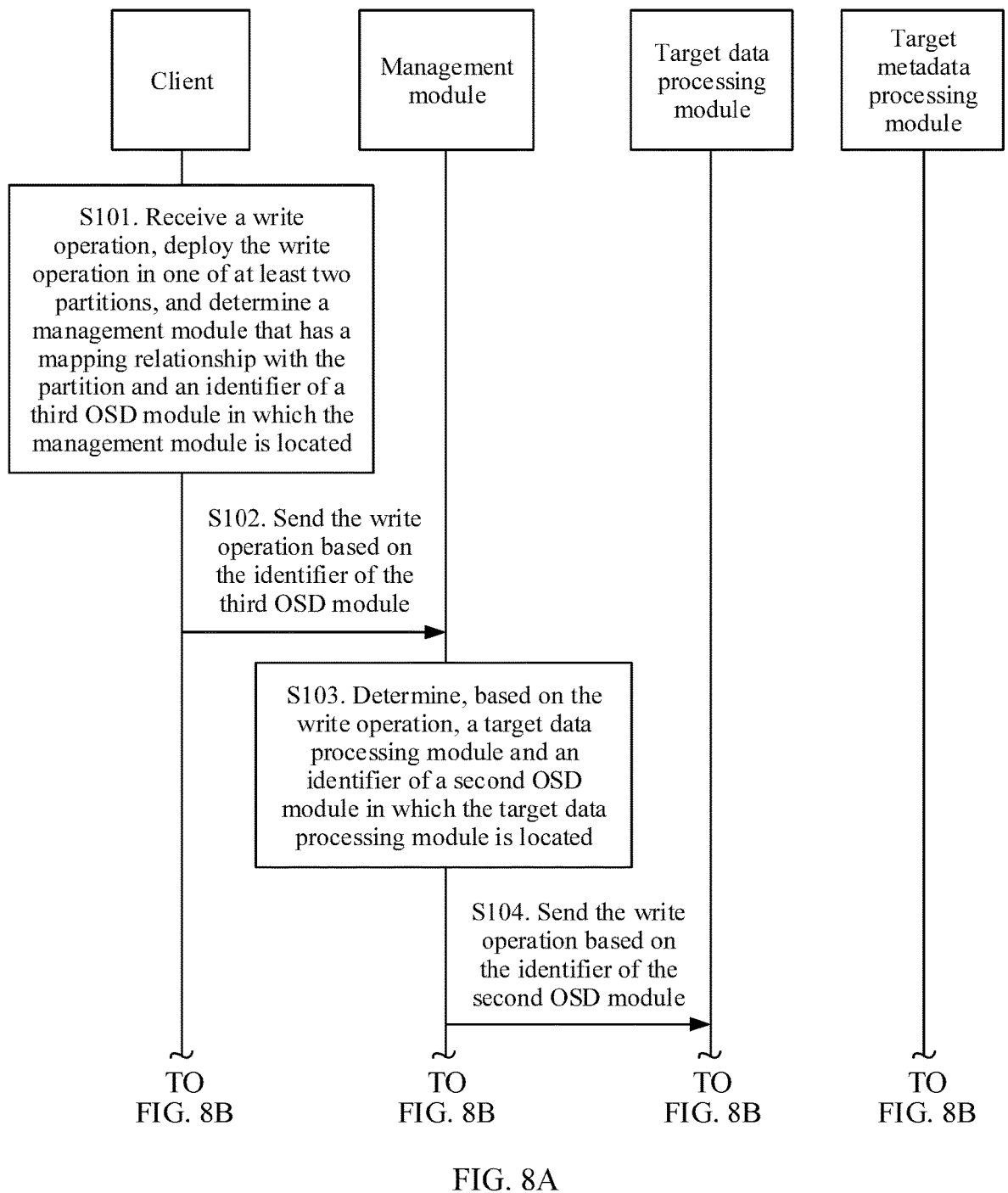
FIG. 8A and FIG. 8B are schematic flowcharts of a data processing method according to an embodiment of this application.
Figure 8B:
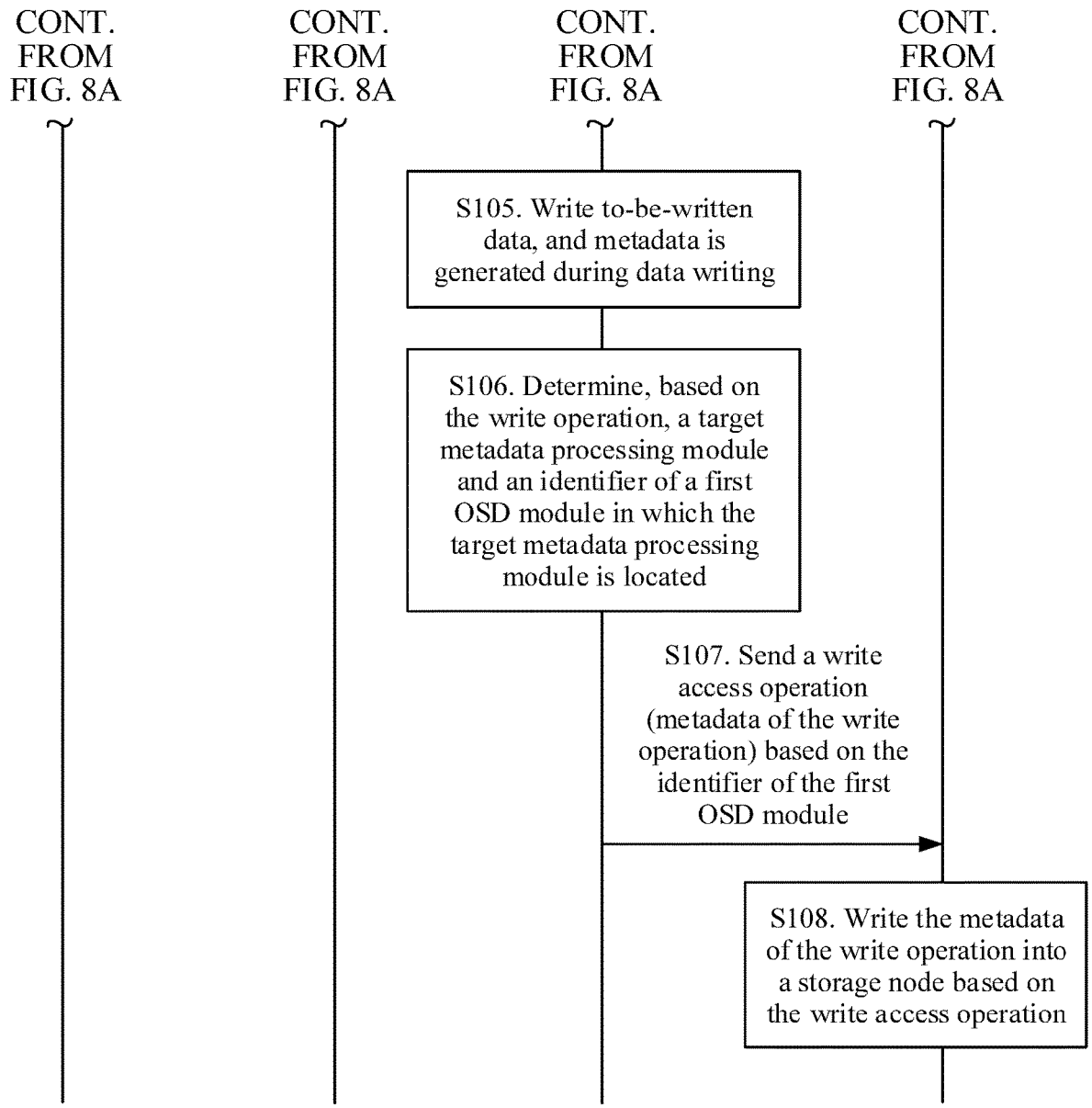

FIG. 8A and FIG. 8B are schematic interaction diagrams of a data processing method according to an embodiment of this application. Further, an example in which an IO operation is a write operation is used for description. The method shown in FIG. 8A and FIG. 8B may include the following steps.

S101. A client receives a write operation, deploys the write operation in one of at least two partitions, and determines a management module that has a mapping relationship with the partition and an identifier of a third OSD module in which the management module is located. The write operation carries to-be-written LBA, to-be-written data, and the like.

The client may be any client deployed in the distributed storage system. The write operation may be any write operation received by the client. A user may send a write operation to the client when having a data writing requirement. Certainly, this application is not limited thereto. After receiving the write operation, the client may convert the write operation into a key-value pair based on some attributes of data of the write operation, for example, LBA, an offset, a snapshot number, or an object name, deploys the write operation in a partition of the distributed storage system using a hash algorithm or another key-value homing algorithm, and determine, based on a mapping relationship between each management module and an OSD module in which each management module is located, an identifier of an OSD module (namely, the third OSD module) in which a management module that has a mapping relationship with the write operation is located. The identifier of the OSD module may be, for example, but is not limited to a process number of the OSD module.

S102. The client sends the write operation to the management module based on the identifier of the third OSD module. Further, the client sends the write operation to the management module deployed on the third OSD module.

S103. The management module determines, based on the write operation, a target data processing module and an identifier of a second OSD module in which the target data processing module is located. The second OSD module and the third OSD module may be a same OSD module, or may be different OSD modules. The target data processing module is a data processing module allocated by the distributed storage system to the write operation, and may be a data processing module allocated by the client or the management module in the distributed storage system to the write operation.

It is assumed that the target data processing module is a data processing module allocated by the client to the write operation. Further, after the client deploys the write operation in one of the partitions in S101, the client may allocate a data processing module to the write operation based on a specific homing algorithm such as the hash algorithm or the another key-value homing algorithm, use the allocated data processing module as the target data processing module, and send, based on the identifier of the third OSD module, an identifier of the target data processing module to the management module deployed on the third OSD module. In this case, that the management module determines a target data processing module in S103 may include that the management module receives the identifier of the target data processing module that is sent by the client.

It is assumed that the target data processing module is a data processing module allocated by the management module to the write operation. Further, after the management module receives the write operation sent by the client, the management module may allocate a data processing module to the write operation based on a homing algorithm such as the hash algorithm or the another key-value homing algorithm, and use the allocated data processing module as the target data processing module.

Regardless of whether the target data processing module is the data processing module allocated by the client or the management module to the write operation, in an implementation, that the management module determines an identifier of a second OSD module in which the target data processing module is located may include that the management module determines, based on a mapping relationship between a data processing module and an OSD module in which the data processing module is located, an identifier of an OSD module (namely, the second OSD module) in which the target data processing module is located. In addition, if the target data processing module is the data processing module allocated by the client to the write operation, in another implementation, after determining the target data processing module, the client may determine the identifier of the second OSD module in which the target data processing module is located, and send the identifier of the second OSD module to the management module deployed on the third OSD module. In this case, that the management module determines an identifier of a second OSD module in which the target data processing module is located may include that the management module receives the identifier of the second OSD module that is sent by the client.

In an example, if the data of the write operation is stored in an EC strip storage manner, after receiving the write operation, the management module may calculate parity data based on the data of the write operation and data of another write operation to establish an EC strip, determine a target data processing module for each data block and each parity block in the EC strip, and write each data block and each parity block into a storage node in S104 to S108. Alternatively, S104 to S108 may be first performed to write the data of the write operation into a storage node. Then, when another write operation is received, parity data is calculated based on the data of the write operation and data of the another write operation to establish the EC strip. Then, a data block corresponding to the another write operation and a parity block corresponding to the parity data are separately written into the storage node in S104 to S108. Certainly, this application is not limited thereto. A specific write operation whose data is used to establish an EC strip and how to calculate a parity block in the EC strip are described in detail in other approaches. Details are not described herein.

In an example, if the data of the write operation is stored in a multi-copy storage manner, after receiving a write operation, the management module may obtain a plurality of pieces of data by copying the data of the write operation, determine a target data processing module for each data block and each duplicate data block, and write each data block and each duplicate data block into a storage node in S104 to S108.

It should be noted that data of an IO operation (including a write operation or a read operation) may include at least one data block. Generally, if data of an IO operation includes a plurality of data blocks, the distributed storage system usually divides the IO operation into several sub-IO operations before performing the IO operation. Data of each sub-IO operation is one data block. For ease of description an example in which the data of the IO operation is one data block is used for description in this application, or an example in which the IO operation is the sub-IO operation is used for description in a specific example of this application, which can be applied to both determining of the target data processing module for the data block and determining of the target data processing module for the IO operation.

S104. The management module sends the write operation to the target data processing module based on the identifier of the second OSD module. Further, the management module sends the write operation to the target data processing module deployed on the second OSD module.

S105. The target data processing module writes to-be-written data into physical storage space corresponding to the to-be-written LBA. Metadata is generated in a data writing process.

S106. The target data processing module determines, based on the write operation, a target metadata processing module and an identifier of a first OSD module in which the target metadata processing module is located. The first OSD module and the third OSD module may be a same OSD module, or may be different OSD modules. The first OSD module and the second OSD module may be a same OSD module, or may be different OSD modules. The target metadata processing module is a metadata processing module allocated by the distributed storage system to the write operation, and may be a metadata processing module allocated by the client, the management module, or the target data processing module in the distributed storage system to the write operation.

It is assumed that the target metadata processing module is a metadata processing module allocated by the client to the write operation. Further, after determining the target data processing module, the client may determine, based on a mapping relationship between the data processing module and the metadata processing module, a target metadata processing module that has a mapping relationship with the target data processing module, and send, based on the identifier of the second OSD module, an identifier of the target metadata processing module to the management module deployed on the third OSD module. The management module sends the identifier of the target metadata processing module to the target data processing module deployed on the second OSD module. In this case, that the target data processing module determines the target metadata processing module may include that the target data processing module receives the identifier of the target metadata processing module that is sent by the client.

It is assumed that the target metadata processing module is a metadata processing module allocated by the management module to the write operation. Further, after determining the target data processing module in S103, the management module may determine, based on a mapping relationship between the data processing module and the metadata processing module, a target metadata processing module that has a mapping relationship with the target data processing module, and send, based on the identifier of the second OSD module, an identifier of the target metadata processing module to the target data processing module deployed on the second OSD module. In this case, that the target data processing module determines the target metadata processing module may include that the target data processing module receives the target metadata processing module sent by the management module.

It is assumed that the target metadata processing module is a metadata processing module allocated by the target data processing module to the write operation. Further, after receiving the write operation, the target data processing module may determine, based on a mapping relationship between the data processing module and the metadata processing module, a metadata processing module that has a mapping relationship with the target data processing module, and use the metadata processing module as the target metadata processing module.

Regardless of whether the target metadata processing module is the metadata processing module allocated by the client, the management module, or the target data processing module to the write operation, in an implementation, that the target data processing module determines an identifier of a first OSD module in which the target metadata processing module is located may include that the target data processing module determines, based on a mapping relationship between the metadata processing module and an OSD module, an identifier of an OSD module (namely, the first OSD module) in which the target metadata processing module is located. In addition, if the target metadata processing module is the metadata processing module allocated by the client to the write operation, in another implementation, that the target data processing module determines an identifier of a first OSD module in which the target metadata processing module is located may include that the target data processing module receives the identifier of the first OSD module that is sent by the client. Moreover, if the target metadata processing module is the metadata processing module allocated by the management module to the write operation, in still another implementation, that the target data processing module determines the identifier of the first OSD module in which the target metadata processing module is located may include that the target data processing module receives the identifier of the first OSD module that is sent by the management module.

A sequence of performing S105 and S106 is not limited in this application. For example, S105 may be performed before S106, or S106 may be performed before S105, or S106 and S105 may be performed at the same time.

S107. The target data processing module sends an access operation to the target metadata processing module based on the identifier of the first OSD module. Further, the management module sends the access operation to the target metadata processing module deployed on the first OSD module. The access operation is a write access operation, and the write access operation carries metadata of the write operation and the to-be-written LBA of the write operation.

S108. The target metadata processing module writes the metadata of the write operation into the storage node based on the write access operation.

In an implementation, if data protection is not performed on metadata of the IO operation, the target metadata processing module may locally write the metadata of the write operation, that is, write the metadata of the write operation into a storage node in which the target metadata processing module is located. Further, the metadata of the write operation may be locally written based on the to-be-written LBA.

In another implementation, if data protection is performed on metadata of the IO operation, for example, the metadata of the write operation is stored in an EC storage manner or a multi-copy storage manner, the target metadata processing module may determine, based on the to-be-written LBA, a storage node in which the metadata of the write operation is located. For example, referring to FIG. 6, the metadata of the write operation may be considered as any metadata in the MD 1 to the MD 4 in FIG. 6.

The data processing method provided in this embodiment may be applied to the distributed storage system shown in FIG. 2, FIG. 4, or FIG. 6. Further, a method for performing a write operation is provided based on the distributed storage system. In this embodiment, the data and the metadata of the write operation are respectively managed by the corresponding data processing module and the corresponding metadata processing module. In this way, compared with a technical solution in other approaches in which data and metadata are managed together, the distributed storage system can separately manage the data and the metadata in order to help improve management performance, and improve overall system performance. The method may be applied to a scenario in which amounts of data and metadata are relatively large. In addition, the data processing module and the metadata processing module are properly deployed, for example, the data processing module is deployed on an HDD and the metadata processing module is deployed on an SSD in order to help improve the overall system performance.

Figure 9B:
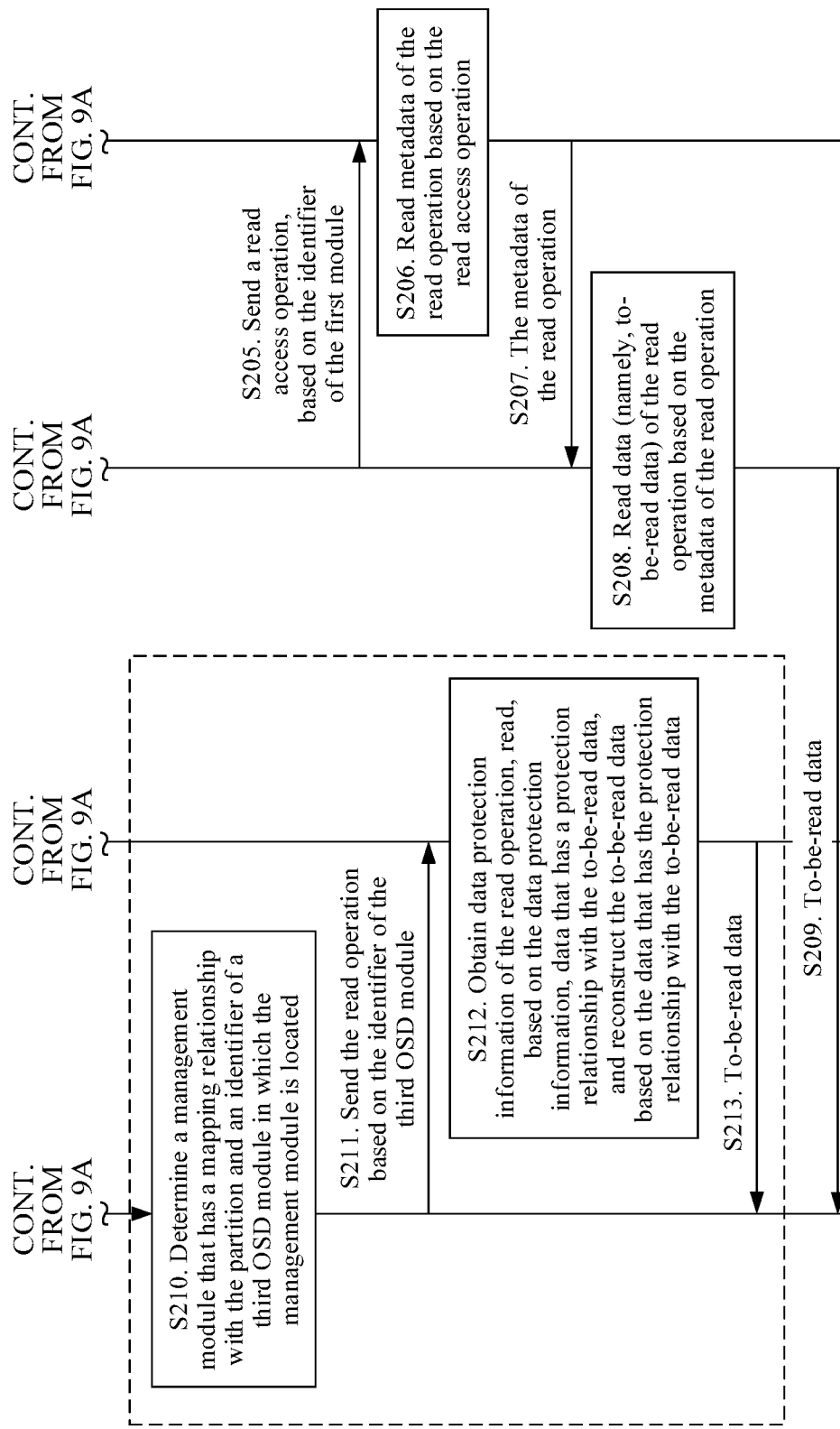

FIG. 9A and FIG. 9B are schematic interaction diagrams of a data processing method according to an embodiment of this application. Further, an example in which an IO operation is a read operation is used for description. The method shown in FIG. 9A and FIG. 9B may include the following steps.

S201. A client receives a read operation, deploys the read operation in one of at least two partitions, deploys the read operation in a target data processing module, and determines an identifier of a second OSD module in which the target data processing module is located. The read operation carries a to-be-read LBA and the like, which are used to read to-be-read data stored in physical storage space corresponding to the to-be-read LBA.

The client may be any client deployed in the distributed storage system. The read operation may be any read operation received by the client. A user may send a read operation to the client when having a data reading requirement. Certainly, this application is not limited thereto. It should be noted that, for explanations of related content in this embodiment, refer to the foregoing descriptions. Details are not described herein again. For example, for a case in which the read operation is deployed in one of partitions, the read operation is deployed on the target data processing module, and the identifier of the second OSD module in which the target data processing module is located is determined, refer to related descriptions of the write operation in S101.

It can be understood that, when this embodiment and the embodiment shown in FIG. 8A and FIG. 8B are applied to a same distributed storage system, and if the to-be-read LBA carried in the read operation is the same as the to-be-written LBA carried in the write operation in the embodiment shown in FIG. 8A and FIG. 8B, the to-be-read data described in this embodiment and the to-be-written data described in the embodiment shown in FIG. 8A and FIG. 8B are the same. One of the partitions and the second OSD module are determined in this embodiment, and a target data processing module, a target metadata processing module, a management module, a first OSD module, a third OSD module, and the like below are all corresponding to the corresponding partitions or modules determined in the embodiment shown in FIG. 8A and FIG. 8B.

S202. The client determines whether data managed by the target data processing module is available.

If the client determines that the data managed by the target data processing module is available, S203 is performed. If the client determines that the data managed by the target data processing module is not available, S210 is performed. It may be understood that when data in a data processing module is migrated, or a storage node in which the data processing module is located is faulty, or the like, data managed by the data processing module may be unavailable.

S203. The client sends the read operation to the target data processing module based on the identifier of the second OSD module. Further, the client sends the read operation to the target data processing module deployed on the second OSD module.

S204. The target data processing module determines, based on the read operation, a target metadata processing module and an identifier of a first OSD module in which the target metadata processing module is located. The target metadata processing module is a metadata processing module allocated by the distributed storage system to the read operation, and may be a metadata processing module allocated by a client or the target data processing module in the distributed storage system to the read operation. For a specific implementation process, refer to related description in S103. Details are not described herein again.

S205. The target data processing module sends an access operation to the target metadata processing module based on the identifier of the first OSD module. Further, the client sends the access operation to the target metadata processing module deployed on the first OSD module. The access operation is a read access operation. The read access operation may carry a to-be-read LBA, which is used to read metadata of the read operation.

S206. The target metadata processing module reads the metadata of the read operation based on the read access operation.

In an implementation, if data protection is not performed on metadata of the IO operation, the target metadata processing module may locally read the metadata of the read operation.

In another implementation, if data protection is performed on metadata of the IO operation, for example, the metadata of the read operation is stored in an EC storage manner or a multi-copy storage manner, the target metadata processing module may determine, based on the to-be-read LBA carried by the read operation, a storage node in which the metadata of the read operation is located. For example, with reference to FIG. 6, the metadata of the read operation may be considered as any metadata in the MD 1 to the MD 4 in FIG. 6.

S207. The target metadata processing module sends the metadata of the read operation to the target data processing module.

S208. The target data processing module reads, based on the metadata of the read operation, data of the read operation (namely, the to-be-read data) stored in physical storage space corresponding to the to-be-read LBA.

S209. The target data processing module returns the to-be-read data to the client.

After S209 is performed, the process ends.

S210. The client determines a management module that has a mapping relationship with the partition and an identifier of a third OSD module in which the management module is located.

S211. The client sends the read operation to the management module based on the identifier of the third OSD module. Further, the client sends the read operation to the management module deployed on the third OSD module.

S212. After receiving the read operation, the management module obtains data protection information of the read operation, reads, based on the data protection information, data that has a protection relationship with the to-be-read data, and reconstructs the to-be-read data based on the data that has the protection relationship with the to-be-read data.

Further, after receiving the read operation, the management module obtains identifiers of OSD modules in which data processing modules that have a mapping relationship with the management module are located, and sends the read operation to a corresponding data processing module based on the identifiers of the OSD modules. The read operation is used to read the data that has the protection relationship with the to-be-read data. These data processing modules read, based on a read request and S204 to S208, the data that has the protection relationship with the to-be-read data, and feed back the read data to the management module. The management module reconstructs the to-be-read data based on the data that has the protection relationship with the to-be-read data, and performs step S213.

S213. The management module returns the to-be-read data to the client.

After S213 is performed, the process ends.

The data processing method provided in this embodiment may be applied to the distributed storage system shown in FIG. 2, FIG. 4, or FIG. 6. Further, based on the distributed storage system, a method for performing the read operation is provided. Optionally, the method for performing the read operation provided in this embodiment may be proposed based on the method for performing the write operation shown in FIG. 8A and FIG. 8B. Therefore, for beneficial effects that can be achieved in this embodiment, refer to the foregoing description. Details are not described herein again.

The foregoing mainly describes the solutions provided in the embodiments of this application from a perspective of the methods. To implement the foregoing functions, corresponding hardware structures and/or software modules for performing the functions are included. A person skilled in the art should easily be aware that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A skilled person may use different methods to implement the described functions for each particular application, but it should not be considered that the implementation goes beyond the scope of this application.

In the embodiments of this application, the foregoing data processing module, the metadata processing module, the management module, and the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in actual implementation.

Figure 10:
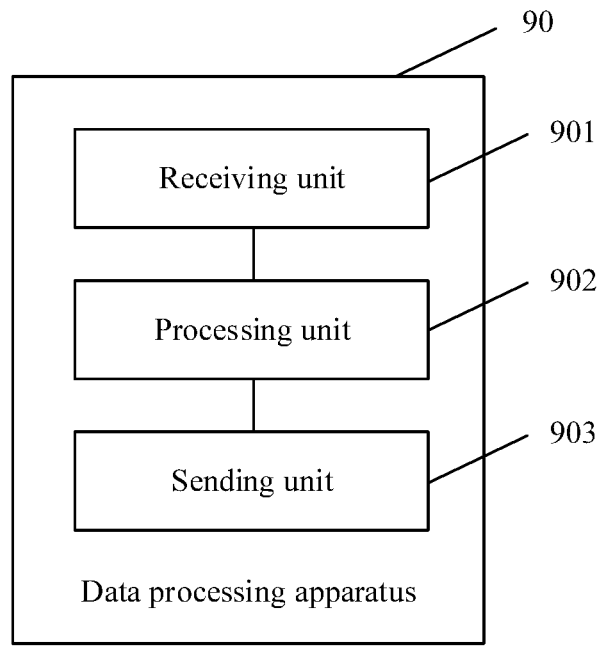
FIG. 10 is a schematic structural diagram of a data processing apparatus according to an embodiment of this application.

FIG. 10 is a schematic structural diagram of a data processing apparatus according to an embodiment of this application. A data processing apparatus 90 shown in FIG. 10 may be applied to any distributed storage system provided above. The distributed storage system may include at least one OSD module, and at least one data processing module and at least one metadata processing module that has a mapping relationship with the at least one data processing module are deployed on the at least one OSD module. The apparatus 90 is a data processing module that is in the at least one data processing module and that is allocated by a distributed storage system to an IO operation, which may be configured to perform the steps performed by the corresponding target data processing module in any one of the data processing methods provided above. The apparatus 90 may include a receiving unit 901, a processing unit 902, and a sending unit 903. The receiving unit 901 is configured to receive an IO operation. The processing unit 902 is configured to determine a target metadata processing module and an identifier of a first OSD module in which the target metadata processing module is located. There is a mapping relationship between the target metadata processing module and the apparatus 90. The sending unit 903 is configured to send an access operation to the target metadata processing module based on the identifier of the first OSD module. The access operation is used to instruct the target metadata processing module to access metadata of the IO operation. The processing unit 902 may be further configured to access data of the IO operation. For example, with reference to FIG. 8A and FIG. 8B, the apparatus 90 may be the target data processing module in FIG. 8A and FIG. 8B. The IO operation may be the write operation. The receiving unit 901 may be configured to perform the receiving step in S104. The processing unit 902 may be configured to perform S106. The sending unit 903 may be configured to perform the sending step in S107. For example, with reference to FIG. 9A and FIG. 9B, the apparatus 90 may be the target data processing module in FIG. 9A and FIG. 9B. The IO operation may be the read operation. The receiving unit 901 may be configured to perform the sending step in S203. The processing unit 902 may be configured to perform S204. The sending unit 903 may be configured to perform the sending step in S205.

Optionally, the processing unit 902 may be further configured to determine, based on the mapping relationship between the data processing module and the metadata processing module, a target metadata processing module that has a mapping relationship with the apparatus 90, and determine, based on a mapping relationship between the metadata processing module and the OSD module in which the metadata processing module is located, the identifier of the first OSD module in which the target metadata processing module is located.

Optionally, the IO operation is a write operation, and the access operation is a write access operation. The write access operation includes metadata of the write operation. In this case, the processing unit 902 may be further configured to write, based on the write operation, data of the write operation into a storage node in which the apparatus 90 is located, and generate the metadata of the write operation. For example, with reference to FIG. 8A and FIG. 8B, the processing unit 902 may be configured to perform S105.

Optionally, the IO operation is a read operation, and the access operation is a read access operation. In this case, the receiving unit 901 may be further configured to receive metadata that is of the read operation and that is sent by the target metadata processing module. The processing unit 902 may be further configured to read data of the read operation based on the read operation and the metadata of the read operation. For example, with reference to FIG. 9A and FIG. 9B, the receiving unit 901 may be configured to perform the receiving step in S207. The processing unit 902 may be configured to perform S208.

In an example, with reference to FIG. 2, the data processing apparatus 90 may correspond to the storage node 22 in FIG. 2. The receiving unit 901 and the sending unit 903 may correspond to the communications interface in FIG. 2. The processing unit 902 may correspond to the processor in FIG. 2.

Reference may be made to the foregoing method embodiments for explanations about related content in this embodiment. Details are not described herein again.

Figure 11:
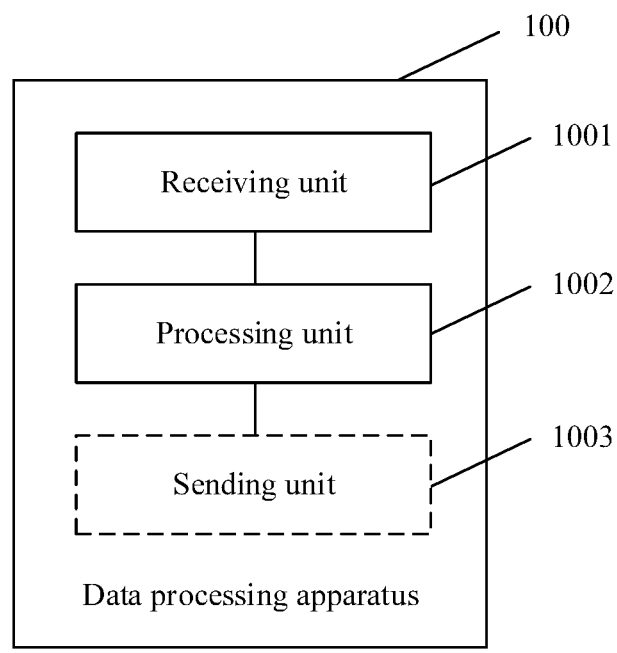
FIG. 11 is a schematic structural diagram of a data processing apparatus according to an embodiment of this application.

FIG. 11 is a schematic structural diagram of a data processing apparatus according to an embodiment of this application. A data processing apparatus 100 shown in FIG. 11 may be applied to any distributed storage system provided above. The distributed storage system may include at least one OSD module, and at least one data processing module and at least one metadata processing module that has a mapping relationship with the at least one data processing module are deployed on the at least one OSD module. The apparatus 100 is a metadata processing module that has a mapping relationship with a target data processing module.

The target data processing module is a data processing module that is in the at least one data processing module and that is allocated by the distributed storage system to an IO operation, which is configured to access data of the IO operation. The apparatus 100 may include a receiving unit 1001, and a processing unit 1002. The receiving unit 1001 is configured to receive an access operation sent by the target data processing module. The processing unit 1002 is configured to access metadata of the IO operation based on the access operation. For example, with reference to FIG. 8A and FIG. 8B, the apparatus 100 may be the target metadata processing module in FIG. 8A and FIG. 8B. The IO operation is a write operation. The receiving unit 1001 may be configured to perform the receiving step in S107. The processing unit 1002 may be configured to perform S108. For example, with reference to FIG. 9A and FIG. 9B, the apparatus 100 may be the target metadata processing module in FIG. 9A and FIG. 9B. The IO operation is a read operation. The receiving unit 1001 may be configured to perform the receiving step in S205. The processing unit 1002 may be configured to perform S206.

Optionally, the IO operation is the write operation, and the access operation is a write access operation. The write access operation carries metadata of the write operation. In this case, the processing unit 1002 may be further configured to write the metadata of the write operation into the at least two storage nodes based on the write access operation. For example, with reference to FIG. 8A and FIG. 8B, the processing unit 1002 may be configured to perform S108.

Optionally, the IO operation is a read operation, and the access operation is a read access operation. In this case, the processing unit 1002 may be further configured to read metadata of the read operation based on the read access operation. The apparatus 100 may further include a sending unit 1003 configured to send the metadata of the read operation to the target data processing module. The metadata of the read operation is used to instruct the target data processing module to read data of the read operation. For example, with reference to FIG. 9A and FIG. 9B, the processing unit 1002 may be configured to perform S206. The sending unit 1003 may be configured to perform the sending step in S207.

In an example, with reference to FIG. 2, the data processing apparatus 100 may correspond to the storage node 22 in FIG. 2. The receiving unit 1001 and the sending unit 1003 may correspond to the communications interface in FIG. 2. The processing unit 1002 may correspond to the processor in FIG. 2.

Reference may be made to the foregoing method embodiments for explanations about related content in this embodiment. Details are not described herein again.

Figure 12:
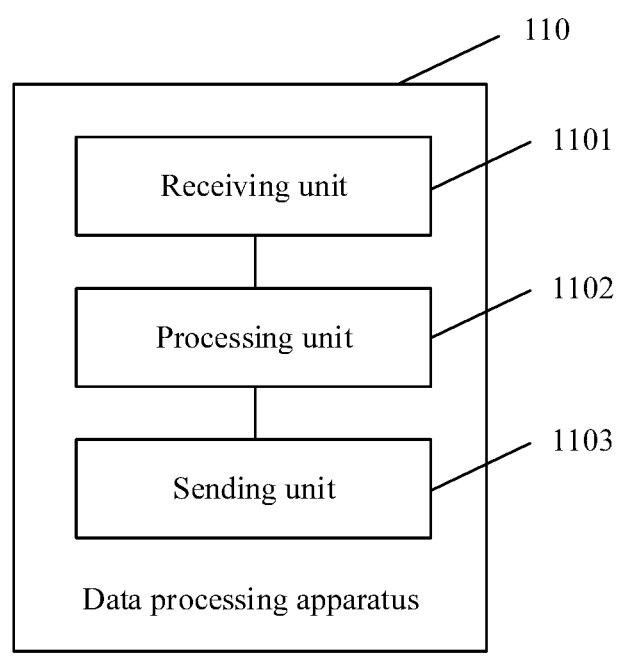
FIG. 12 is a schematic structural diagram of a data processing apparatus according to an embodiment of this application.

FIG. 12 is a schematic structural diagram of a data processing apparatus according to an embodiment of this application. A data processing apparatus 110 shown in FIG. 12 may be applied to any distributed storage system provided above. The distributed storage system may include at least one OSD module, and the apparatus 110, at least one data processing module that has a mapping relationship with the apparatus 110, and at least one metadata processing module that has a mapping relationship with the at least one data processing module are deployed on the at least one OSD module. The apparatus 110 is configured to manage data protection information of the IO operation. The apparatus 110 may include a receiving unit 1101, a processing unit 1102, and a sending unit 1103.

In some embodiments, the receiving unit 1101 is configured to receive an IO operation, and the IO operation is a write operation. The processing unit 1102 is configured to determine a target data processing module and an identifier of a second OSD module in which the target data processing module is located. The target data processing module is a data processing module that is in the at least one data processing module and that is allocated by a distributed storage system to the IO operation. The sending unit 1103 is configured to send the write operation to the target data processing module based on the identifier of the second OSD module. The write operation is used to instruct the target data processing module to determine a target metadata processing module and an identifier of a first OSD module in which the target metadata processing module is located, and send a write access operation to the target metadata processing module. The write access operation is used to instruct the target metadata processing module to read metadata of the write operation. The target data processing module is further configured to read data of the write operation based on metadata of the IO operation. For example, with reference to FIG. 8A and FIG. 8B, the apparatus 110 may be the management module in FIG. 8A and FIG. 8B. The IO operation may be the write operation. The receiving unit 1101 may be configured to perform the receiving step in S102. The processing unit 1102 may be configured to perform S103. The sending unit 1103 may be configured to perform the sending step in S104.

Optionally, the processing unit 1102 may be further configured to calculate data protection information of the write operation.

Optionally, the distributed storage system further includes a client. In this case, the receiving unit 1101 may be further configured to receive the write operation sent by the client. For example, with reference to FIG. 8A and FIG. 8B, the receiving unit 1101 may be configured to perform the receiving step in S102.

In some embodiments, the receiving unit 1101 is configured to receive an IO operation, and the IO operation is a write operation. The processing unit 1102 is configured to obtain data protection information of a read operation, read data that has a protection relationship with the data of the read operation based on the data protection information, and reconstruct data of the read operation based on the data that has the protection relationship with the data of the read operation. For example, with reference to FIG. 9A and FIG. 9B, the apparatus 110 may be the management module in FIG. 9A and FIG. 9B. The IO operation may be the read operation. The receiving unit 1101 may be configured to perform the receiving step in S211. The processing unit 1102 may be configured to perform S212.

Optionally, the distributed storage system further includes a client. In this case, the receiving unit 1101 may be further configured to receive a write operation sent by the client. The sending unit 1103 is configured to send data of the read operation to the client. For example, with reference to FIG. 9A and FIG. 9B, the receiving unit 1101 may be configured to perform the receiving step in S211. The sending unit 1103 may be configured to perform the returning step in S213.

In an example, with reference to FIG. 2, the data processing apparatus 110 may correspond to the storage node 22 in FIG. 2. The receiving unit 1101 and the sending unit 1103 may correspond to the communications interface in FIG. 2. The processing unit 1102 may correspond to the processor in FIG. 2.

Reference may be made to the foregoing method embodiments for explanations about related content in this embodiment. Details are not described herein again.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, an SSD), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of "a plurality of". A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, apparently, various modifications and combinations may be made to this application without departing from the spirit and scope of this application. Correspondingly, the specification and accompanying drawings are merely example descriptions of this application defined by the accompanying claims, and are considered as any or all of modifications, variations, combinations, or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A distributed storage system comprising:
    a plurality of storage nodes, wherein at least one storage node comprises at least one object storage device (OSD), wherein the at least one OSD comprises a data processing device and a metadata processing device that has a mapping relationship with the data processing device;
    a target metadata processing device; and
    a target data processing device, wherein the distributed storage system is allocated to —an input/output (IO) operation, having a first mapping relationship with and coupled to the target data processing device and configured to:
       receive the IO operation;
       access data of the IO operation;
       determine the target metadata processing device and a first identifier of a first OSD in which the target metadata processing device is located; and
       send an access operation to the target metadata processing device based on the first identifier,
    wherein the target metadata processing device is configured to:
       receive the access operation; and
       access metadata of the IO operation based on the access operation.

2. The distributed storage system of claim 1, wherein the target data processing device is further configured to:
    determine, based on the first mapping relationship, the target metadata processing device; and
    determine, based on a second mapping relationship between the target metadata processing device and the first OSD, the first identifier.

3. The distributed storage system of claim 1, wherein the IO operation is a write operation, wherein the access operation is a write access operation that carries metadata of the write operation, wherein the target data processing device is further configured to:
    write, based on the write operation, data of the write operation into a storage node in which the target data processing device is located; and
    generate the metadata of the write operation, and
    wherein the target metadata processing device is further configured to write the metadata of the write operation into at least two storage nodes based on the write access operation.

4. The distributed storage system of claim 1, wherein the IO operation is a read operation, wherein the access operation is a read access operation, wherein the target metadata processing device is further configured to:
    read metadata of the read operation based on the read access operation; and
    send the metadata of the read operation to the target data processing device, and
    wherein the target data processing device is further configured to read data of the read operation based on the read operation and the metadata of the read operation.

5. The distributed storage system of claim 1, further comprising a second OSD in which the target data processing device is located, wherein the first OSD is different from the second OSD.

6. The distributed storage system of claim 1, wherein each of the OSDs further comprises a management device, wherein the management device comprises a third mapping relationship between the management device and the data processing device, and wherein the management device is configured to:
    receive the IO operation, wherein the IO operation is a write operation; and
    calculate data protection information of the write operation.

7. The distributed storage system of claim 6, further comprising a client configured to:
    receive the IO operation;

determine the management device and a third identifier of a third OSD in which the management device is located; and send the IO operation to the management device based on the third identifier.

8. The distributed storage system of claim 6, wherein the management device is further configured to:

receive the IO operation, wherein the IO operation is the write operation;

determine the target data processing device and a second identifier of a second OSD in which the target data processing device is located; and send the write operation to the target data processing device based on the second identifier.

9. The distributed storage system of claim 1, further comprising a client configured to:

receive the IO operation, wherein the IO operation is a read operation;

determine the target data processing device and a second identifier of a second OSD in which the target data processing device is located; and send the read operation to the target data processing device based on the second identifier.

10. The distributed storage system of claim 1, wherein each of the OSDs further comprises a management device, wherein the management device comprises a third mapping relationship between the management device and the data processing device, and wherein the management device is configured to:

receive the IO operation, wherein the IO operation is a read operation;

obtain data protection information of the read operation;

read, based on the data protection information, data comprising a protection relationship with data of the read operation; and reconstruct the data of the read operation based on the data comprising the protection relationship with the data of the read operation.

11. A data processing method implemented by a target data processing device of a distributed storage system, wherein the data processing method comprises:

receiving an input/output (IO) operation;

allocating the target data processing device to the IO operation;

determining a target metadata processing device and a first identifier of a first object storage device (OSD) in which the target metadata processing device is located, wherein the target metadata processing device comprises a first mapping relationship with the target data processing device;

sending an access operation to the target metadata processing device based on the first identifier to instruct the target metadata processing device to access metadata of the IO operation; and accessing data of the IO operation based on the IO operation.

12. The data processing method of claim 11, further comprising:

determining based on the first mapping relationship, the target metadata processing device that has the mapping relationship with the target data processing module; and determining, based on a second mapping relationship between the target metadata processing device and the first OSD, the first identifier in which the target metadata processing module is located.

13. The data processing method of claim 11, wherein the IO operation is a write operation, wherein the access operation is a write access operation comprising metadata of the write operation, and wherein the data processing method further comprises:

writing, based on the write operation, data of the write operation into a storage node in which the target data processing device is located; and generating the metadata of the write operation.

14. The data processing method of claim 11, wherein the IO operation is a read operation, wherein the access operation is a read access operation, and wherein the data processing method further comprises:

receiving metadata of the read operation from the target metadata processing device; and reading data of the read operation based on the read operation and the metadata of the read operation.

15. A data processing method implemented by a target metadata processing device of a distributed storage system, wherein the data processing method comprises:

receiving an access operation from a target data processing device that is allocated by the distributed storage system to an input/output (IO) operation wherein the target metadata processing device comprises a first mapping relationship with the target data processing device, wherein the distributed storage system further comprises a plurality of storage nodes, wherein each of the storage nodes comprises a plurality of object storage devices (OSDs), and wherein each of the OSDs comprises a data processing device and a metadata processing device; and accessing metadata of the IO operation based on the access operation.

16. The data processing method of claim 15, wherein the IO operation is a write operation, wherein the access operation is a write access operation that carries metadata of the write operation, and wherein the data processing method further comprises writing the metadata of the write operation into at least two storage nodes based on the write access operation.

17. The data processing method of claim 15, wherein the IO operation is a read operation, wherein the access operation is a read access operation, and wherein the data processing method further comprises:

reading metadata of the read operation based on the read access operation; and sending the metadata of the read operation to the target data processing device to instruct the target data processing device to read data of the read operation.

18. A storage node of a distributed storage system, wherein the distributed storage system comprises a plurality of object storage devices (OSDs), wherein each of the OSDs comprises a data processing device and a metadata processing device, and wherein the storage node comprises:

a memory configured to store a computer program; and a processor coupled to the memory and configured to invoke the computer program to implement functions of a target data processing device, wherein the distributed storage system is configured to allocate the target data processing device to an input/output (IO) operation, and wherein the functions of the target data processing device comprise:

receiving the IO operation;

determining a target metadata processing device and a first identifier of a first OSD in which the target metadata processing device is located, wherein a first mapping relationship comprises between the target metadata processing device and the target data processing device;

sending an access operation to the target metadata processing device based on the first identifier to instruct the target metadata processing device to access metadata of the IO operation; and accessing data of the TO operation.

19. The storage node of claim 18, wherein the IO operation is a write operation, wherein the access operation is a write access operation comprising metadata of the write operation, and wherein the functions of the target data processing device further comprises:

writing, based on the write operation, data of the write operation into a storage node in which the target data processing device is located; and generating the metadata of the write operation.

20. The storage node of claim 18, wherein the IO operation is a read operation, wherein the access operation is a read access operation, and wherein the functions of the target data processing device further comprises:

receiving metadata of the read operation from the target metadata processing device; and reading data of the read operation based on the read operation and the metadata of the read operation.

* * * * *

UNITED STATES PATENT AND TRADEMARK OFFICE
CERTIFICATE OF CORRECTION

| | | |
|---|---|---|
| PATENT NO. | : 11,262,916 B2 | Page 1 of 1 |
| APPLICATION NO. | : 16/943279 | |
| DATED | : March 1, 2022 | |
| INVENTOR(S) | : Zhangling Wu and Mingchang Wei | |

It is certified that error appears in the above-identified patent and that said Letters Patent is hereby corrected as shown below:

In the Claims

Claim 1, Column 28, Line 2: "allocated to –an input/output" should read "allocated to an input/output"

Signed and Sealed this
Tenth Day of May, 2022

*Katherine Kelly Vidal*

Katherine Kelly Vidal
*Director of the United States Patent and Trademark Office*